(12) United States Patent
Johnsen et al.

(10) Patent No.: US 9,852,199 B2
(45) Date of Patent: Dec. 26, 2017

(54) SYSTEM AND METHOD FOR SUPPORTING PERSISTENT SECURE MANAGEMENT KEY (M_KEY) IN A NETWORK ENVIRONMENT

(71) Applicant: Oracle International Corporation, Redwood Shores, CA (US)

(72) Inventors: Bjørn Dag Johnsen, Oslo (NO); Dag Georg Moxnes, Oslo (NO); Predrag Hodoba, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 297 days.

(21) Appl. No.: 13/892,152

(22) Filed: May 10, 2013

(65) Prior Publication Data
US 2013/0304908 A1   Nov. 14, 2013

Related U.S. Application Data

(60) Provisional application No. 61/645,517, filed on May 10, 2012.

(51) Int. Cl.
*G06F 17/30*   (2006.01)
*H04L 12/24*   (2006.01)
(Continued)

(52) U.S. Cl.
CPC ........ *G06F 17/30575* (2013.01); *H04L 41/00* (2013.01); *H04L 41/046* (2013.01);
(Continued)

(58) Field of Classification Search
CPC ..... H04L 63/20; H04L 41/0873; H04L 41/24; H04L 41/00; H04L 49/358; H04L 63/061;
(Continued)

(56) References Cited

U.S. PATENT DOCUMENTS

| | | |
|---|---|---|
| 5,758,083 A | 5/1998 | Singh et al. |
| 6,012,100 A | 1/2000 | Frailong |

(Continued)

FOREIGN PATENT DOCUMENTS

| | | |
|---|---|---|
| CN | 1514625 | 7/2004 |
| CN | 1520556 | 8/2004 |

(Continued)

OTHER PUBLICATIONS

Shanley, Tom, "Infiniband Network Architecture" (excerpt), Pearson Education, Copyright © 2002 by MindShare, Inc., published Oct. 2002, p. 204-209, 560-564.

(Continued)

*Primary Examiner* — Nicholas Taylor
*Assistant Examiner* — Tania Pena-Santana
(74) *Attorney, Agent, or Firm* — Tucker Ellis LLP

(57) ABSTRACT

A system and method can support security management in a network environment. A switch in the network environment includes a switch chip, which is configured with a secure management key (M_Key) prior to one or more external links becoming operational. Furthermore, a local daemon in the switch can monitor the secure M_key on the switch chip, and persistently store a current M_key used by a local subnet manager (SM). The current M_Key is a state that is dynamically updated in a fabric in the network environment.

20 Claims, 14 Drawing Sheets

(51) Int. Cl.
*H04L 12/931* (2013.01)
*H04L 29/06* (2006.01)
*H04L 12/26* (2006.01)
*H04L 29/08* (2006.01)

(52) U.S. Cl.
CPC ...... *H04L 41/0806* (2013.01); *H04L 41/0873* (2013.01); *H04L 41/24* (2013.01); *H04L 43/00* (2013.01); *H04L 49/358* (2013.01); *H04L 63/061* (2013.01); *H04L 63/20* (2013.01); *H04L 67/1051* (2013.01)

(58) Field of Classification Search
CPC ... H04L 41/046; H04L 43/00; H04L 41/0806; H04L 67/1051; G06F 17/30575
See application file for complete search history.

(56) References Cited

U.S. PATENT DOCUMENTS

| | | | |
|---|---|---|---|
| 6,098,098 | A | 8/2000 | Sandahl et al. |
| 6,282,678 | B1 | 8/2001 | Snay |
| 6,286,038 | B1 | 9/2001 | Reichmeyer |
| 6,314,531 | B1 | 11/2001 | Kram |
| 6,343,320 | B1 | 1/2002 | Fairchild et al. |
| 6,658,579 | B1 | 12/2003 | Bell et al. |
| 6,697,360 | B1 | 2/2004 | Gai |
| 6,772,320 | B1 | 8/2004 | Raj |
| 6,941,350 | B1 | 9/2005 | Frazier |
| 6,981,025 | B1* | 12/2005 | Frazier ............. H04L 69/26 709/209 |
| 7,023,795 | B1 | 4/2006 | Hwu |
| 7,113,995 | B1 | 9/2006 | Beukema et al. |
| 7,290,277 | B1* | 10/2007 | Chou ................. H04L 63/08 713/152 |
| 7,398,394 | B1* | 7/2008 | Johnsen ............. H04L 63/08 713/150 |
| 7,409,432 | B1 | 8/2008 | Recio et al. |
| 7,437,447 | B2 | 10/2008 | Brey et al. |
| 7,493,409 | B2 | 2/2009 | Craddock et al. |
| 7,548,545 | B1 | 6/2009 | Wittenschlaeger |
| 7,577,996 | B1 | 8/2009 | Merchant |
| 7,636,772 | B1 | 12/2009 | Kirby et al. |
| 7,721,324 | B1 | 5/2010 | Jackson |
| 7,860,006 | B1 | 12/2010 | Kashyap et al. |
| 8,327,437 | B2 | 12/2012 | McAlister |
| 8,331,381 | B2 | 12/2012 | Brown et al. |
| 8,549,281 | B2 | 10/2013 | Samovskiy et al. |
| 8,645,524 | B2 | 2/2014 | Pearson |
| 8,842,518 | B2 | 9/2014 | Johnsen |
| 2002/0016858 | A1 | 2/2002 | Sawada et al. |
| 2002/0059597 | A1 | 5/2002 | Kikinis et al. |
| 2002/0133620 | A1 | 9/2002 | Krause |
| 2003/0005039 | A1 | 1/2003 | Craddock |
| 2003/0105914 | A1 | 6/2003 | Dearth et al. |
| 2004/0013088 | A1 | 1/2004 | Gregg |
| 2004/0028047 | A1 | 2/2004 | Hou et al. |
| 2004/0037279 | A1 | 2/2004 | Zelig |
| 2004/0078709 | A1 | 4/2004 | Beukema |
| 2004/0103282 | A1 | 5/2004 | Meier et al. |
| 2004/0168089 | A1 | 8/2004 | Lee |
| 2005/0071709 | A1 | 3/2005 | Rosenstock |
| 2005/0100033 | A1 | 5/2005 | Arndt |
| 2005/0108434 | A1 | 5/2005 | Witchey |
| 2005/0198250 | A1 | 9/2005 | Wang |
| 2005/0213608 | A1 | 9/2005 | Modi |
| 2005/0273641 | A1 | 12/2005 | Sandven et al. |
| 2006/0215673 | A1 | 9/2006 | Olvera-Hemandez |
| 2006/0230219 | A1 | 10/2006 | Njoku |
| 2007/0022479 | A1 | 1/2007 | Sikdar et al. |
| 2007/0038703 | A1 | 2/2007 | Tendjoukian et al. |
| 2007/0058657 | A1* | 3/2007 | Holt ................. H04L 41/0226 370/438 |
| 2007/0073882 | A1 | 3/2007 | Brown |
| 2007/0140266 | A1 | 6/2007 | Njoku |
| 2007/0162520 | A1 | 7/2007 | Petersen |
| 2007/0180497 | A1 | 8/2007 | Popescu |
| 2007/0198656 | A1 | 8/2007 | Mazzaferri et al. |
| 2007/0280104 | A1 | 12/2007 | Miyoshi |
| 2007/0294405 | A1 | 12/2007 | Mohindra |
| 2008/0137528 | A1* | 6/2008 | O'Toole ............ G06F 11/1425 370/216 |
| 2008/0184332 | A1 | 7/2008 | Gerkis |
| 2008/0250125 | A1 | 10/2008 | Brey et al. |
| 2008/0267183 | A1 | 10/2008 | Arndt |
| 2008/0301256 | A1 | 12/2008 | McWilliams et al. |
| 2009/0073895 | A1 | 3/2009 | Morgan et al. |
| 2009/0080328 | A1 | 3/2009 | Hu |
| 2009/0216853 | A1 | 8/2009 | Urrow |
| 2009/0234974 | A1 | 9/2009 | Arndt |
| 2010/0054129 | A1 | 3/2010 | Kuik |
| 2010/0138532 | A1 | 6/2010 | Glaeser et al. |
| 2010/0146093 | A1 | 6/2010 | Kuik |
| 2010/0228961 | A1* | 9/2010 | Burns ............... H04L 45/04 713/150 |
| 2011/0023108 | A1 | 1/2011 | Geldermann et al. |
| 2011/0131447 | A1 | 6/2011 | Prakash et al. |
| 2012/0291028 | A1 | 11/2012 | Kidambi |
| 2012/0314706 | A1 | 12/2012 | Liss |
| 2013/0036136 | A1 | 2/2013 | Horii |
| 2013/0077492 | A1 | 3/2013 | Scaglione |

FOREIGN PATENT DOCUMENTS

| | | |
|---|---|---|
| CN | 1536842 | 10/2004 |
| CN | 1617526 | 5/2005 |
| EP | 2160068 | 3/2010 |
| WO | 2012037518 | 3/2012 |

OTHER PUBLICATIONS

Lee, M., Security Enhancement in Infiniband Architecture, IEEE, vol. 19, Apr. 2005, pp. 1-18.

Shanley, Tom, Infiniband Network Architecture (excerpt), Pearson Education, published 2002, p. 209-211, 393-394, 551, 554.

International Search Report dated Sep. 23, 2013 for Application No. PCT/US2013/040639, 10 pages.

International Search Report dated Sep. 26, 2013 for Application No. PCT/US2013/040656, 10 pages.

Tom Shanley, Infiniband Network Architecture (excerpt), Pearson Education, Published 2002, p. 213.

Search Report from State Intellectual Property Office of the People's Republic of China for Application No. 201280030334.2 dated Aug. 21, 2015, 2 pages.

Shanley, Tom, "Infiniband Network Architecture" (Excerpt), Copyright 2002 by Mindshare, Inc., p. 86-87.

State Intellectual Property Office of the People'S Republic of China, Search Report, Office Action dated Jun. 1, 2016 for Chinese Patent Application No. 201380014177.0, 8 pages.

European Patent Office, Examining Division, Communication Pursuant to Article 94(3) EPC Dated Dec. 15, 2016 for European Patent Application No. 12736044.4, 7 pages.

Flextronics®, 14.5U 4X SDR/DDR InfiniBand Switch Platform User's Manual Rev 0.10, © Copyright 2007, Flextronics International, 22 pages.

* cited by examiner

SYSTEM AND METHOD FOR SUPPORTING PERSISTENT SECURE MANAGEMENT KEY (M_KEY) IN A NETWORK ENVIRONMENT

CLAIM OF PRIORITY

This application claims priority on U.S. Provisional Patent Application No. 61/645,517, entitled "SYSTEM AND METHOD FOR PROVIDING SECRET MANAGEMENT KEY IN A MIDDLEWARE MACHINE ENVIRONMENT" filed May 10, 2012, which application is herein incorporated by reference.

CROSS REFERENCE TO RELATED APPLICATIONS

This application is related to the following patent applications, each of which is hereby incorporated by reference in its entirety:

U.S. patent application Ser. No. 13/892,122, filed May 10, 2013 entitled SYSTEM AND METHOD FOR PROVIDING A TRANSACTIONAL COMMAND LINE INTERFACE (CLI) IN A NETWORK ENVIRONMENT;

U.S. patent application Ser. No. 13/892,129, filed May 10, 2013 entitled SYSTEM AND METHOD FOR SUPPORTING CONFIGURATION DAEMON (CD) IN A NETWORK ENVIRONMENT;

U.S. patent application Ser. No. 13/892,133, filed May 10, 2013 entitled SYSTEM AND METHOD FOR SUPPORTING STATE SYNCHRONIZATION IN A NETWORK ENVIRONMENT;

U.S. patent application Ser. No. 13/892,162, filed May 10, 2013 entitled SYSTEM AND METHOD FOR SUPPORTING SUBNET MANAGER (SM) MASTER NEGOTIATION IN A NETWORK ENVIRONMENT; and U.S. patent application Ser. No. 13/892,174, filed May 10, 2013 entitled SYSTEM AND METHOD FOR SUPPORTING A DRY-RUN MODE IN A NETWORK ENVIRONMENT.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software, and is particularly related to supporting a network environment.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements.

Due to its low latency, high bandwidth, and efficient utilization of host-side processing resources, IB technology has been gaining acceptance within the High Performance Computing (HPC) community as a solution to build large and scalable computer clusters.

SUMMARY

Described herein are systems and methods that can support security management in a network environment. A switch in the network environment includes a switch chip, which is configured with a secure management key (M_Key) prior to one or more external links becoming operational. Furthermore, a local daemon in the switch can monitor the secure M_key on the switch chip, and persistently store a current M_key used by a local subnet manager (SM). The current M_key is a state that is dynamically updated in a fabric in the network environment.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Infiniband (IB) network as an example for a high performance network. It will be apparent to those skilled in the art that other types of high performance networks can be used without limitation.

Described herein are systems and methods that can support subnet management in a network, such as an IB network.

Persistent Secure M_Key

In accordance with an embodiment of the invention, a secure management key (M_Key) can be installed, or configured, on a switch chip prior to the external links becoming operational. Thus, the system can prevent the network switch from being hijacked by any rough host software/administrator, e.g. using subnet management packets (SMPs) with M_Key setting before a master subnet manager (SM) can configure it.

Figure 1:
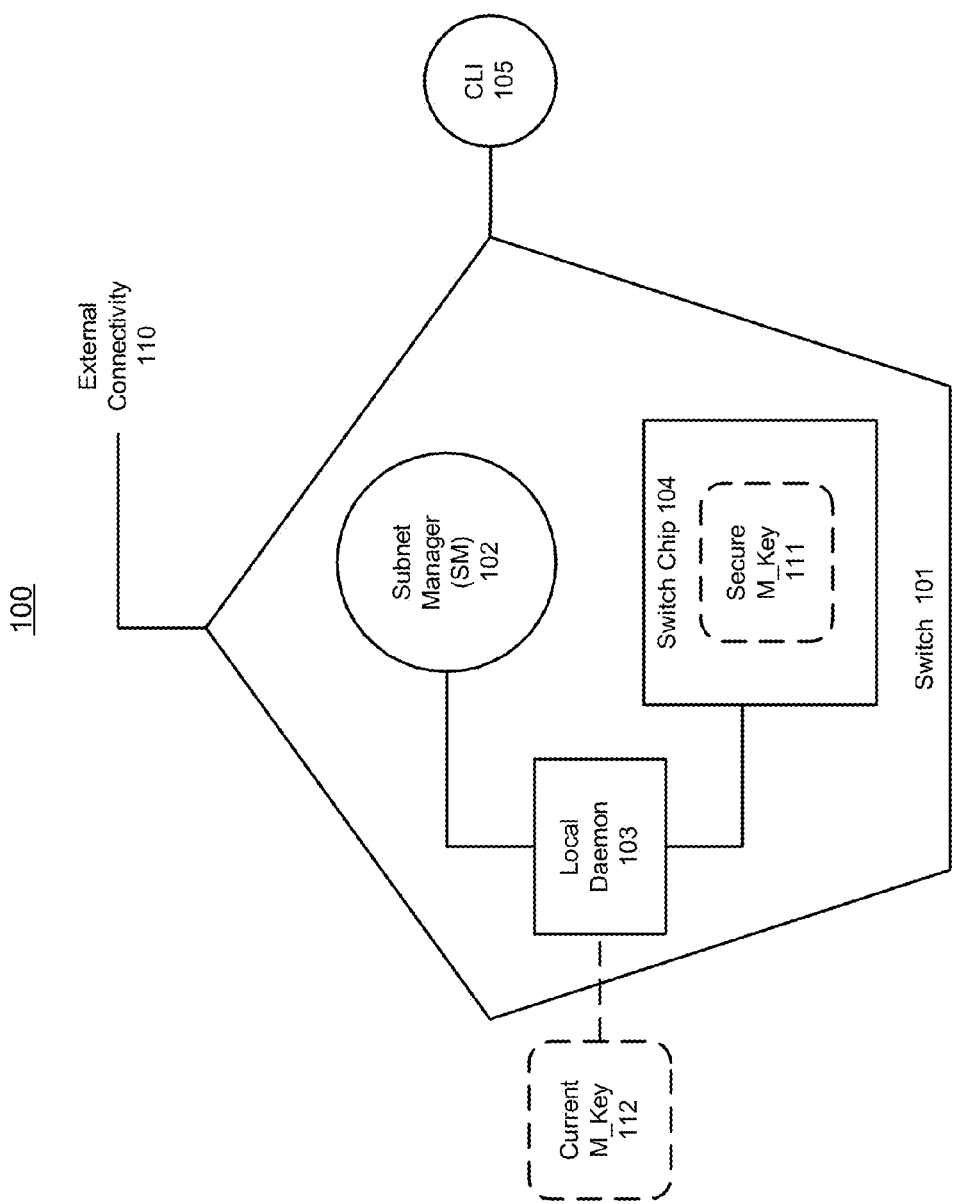
FIG. 1 shows an illustration of supporting a persistent secure M_Key in a network environment, in accordance with an embodiment of the invention.

FIG. 1 shows an illustration of supporting a persistent secure M_Key in a network environment, in accordance with an embodiment of the invention. As shown in FIG. 1, a switch 101 in a network environment 100 can use a switch chip 104, e.g. an IS4 switch chip on a NM2 switch. Additionally, a local daemon 103 can monitor the secure M_Key value 111 set up in the local switch chip 104 constantly.

In accordance with an embodiment of the invention, the system can ensure that all switches in the system can automatically get in synchronization with the currently (explicitly) defined M_Keys for SM usage.

Additionally, the switch 101 can provide a command line interface (CLI) 105 to the user for configuring the secure M_Key 111. For example, a NM2 (platform local) configuration CLI command, "localmkeypersistence," can include the following sub-commands:

"enable"—Enable persistence.
"disable"—Disable persistence.
"show"—Display the current persistence mode (enabled/disabled) as well as currently recorded value if enabled.
"help"—Help When the "persistence" mode is enabled, the local daemon 103 can persistently store the current key value. Also, when the network switch is rebooted, the current persistent key value can be initialized in the switch chip prior to enabling external connectivity 110, e.g. external link training.

Furthermore, the system can be configured as in a "persistence" mode using configuration files, e.g. Oracle Integrated Lights Out Manager (ILOM) configuration backup/restore, while the actual current M_Key value 112 may not be included in configuration files, since the M_Key values 112 can be dynamically updated in the fabric and may not be considered belonging to any individual network switch. Also, the "persistence" mode can apply to the currently defined local M_Key value 112 independently of whether it is "secret" or "readable", and whether it is cleared (or null).

Additionally, the network switch can become unmanageable for the SM 102 when a network switch has a stale persistent secret M_Key value, since the secret M_Key value may not be included in the list of currently known secret M_Key values. This scenario can happen when the network switch has been offline, when the administration rules of not removing a known M_Key value that can still be in use has not been observed, or when a physical network switch instance have been physically moved between different physical IB subnets.

An explicit CLI command, e.g. a "smsubnetprotection setlocalsecretmkey" CLI command, can be used to update the M_Key 111 on the local switch chip 104 with the current SM_Key value 112, or at least a value known by the SM 102. This update can be atomic relative to other updates by the local monitoring daemon 103 or the SM 102. Alternatively, the system can add the stale M_Key value 111 to the list of known M_Key values, so that the SM can handle it directly. Here, since the SM level update is considered as a heavyweight operation, the local "setlocalsecretmkey" command can be a preferred method for handling a stale persistent secret M_Key value.

Furthermore, the administrator can ensure that the network switches can be configured with the correct active M_Key value before completing the upgrade/configuration change.

For example, when a network switch 101 is introduced in an already operational system, e.g. using the "smsubnetprotection setlocalsecretmkey" command. The system can ensure that the network switch 101 does not expose to any external IB connectivity 110 without being protected by secret M_Key 111 in the first place. Also, the new network switch 101 may be introduced in the running system without any local setup of secret M_Key value. In such a case, the network switch 101 may remain vulnerable, or "volatile for attack," until the SM 102 has configured the running M_Key (normally in a very short time).

Additionally, the system can include an enhanced version of the ibportstate command that allows operation with secret M_Key value, i.e. the system can perform enable operations on remote network switch with firmware that may not support secret M_Key.

In accordance with an embodiment of the invention, if secret M_Key is enabled on a network switch that already has readable M_Key enabled, then the readable M_Key configuration may remain intact and can be ignored as long as the secret M_Key configuration is active. When the secret M_Key is disabled, or when the firmware on the network switch is downgraded, the existing readable M_Key configuration can become active again. The readable M_Key values may be only used by the SM 102, and may be indirectly monitored when polling the current M_Key value stored on the switch chip 104, e.g. the IS4 chip on NM2 switch.

In order to ensure that the M_Key lease period does not expire, e.g. when no master SM is currently active in the system, the monitoring daemon can include a periodic subnet management packet (SMP) based get operation to retrieve the M_Key value 111 stored on the switch chip 104, using the M_Key value observed via an out-of-band (OOB) interface on the switch chip 104. The poll frequency for this get operation can be high enough to guarantee that no M_Key lease time expiration can happen independently of the SM activity.

Furthermore, the SMP based get operation can update the M_Key lease time, and can use the OOB interface of the switch chip 104 to obtain the local M_Key value that must be used in the SMP based M_Key retrieval.

Also, this scheme may be subject to a race when the SM may update the M_Key value between the OOB read operation and the SMP get operation. However, this scheme will not harm to the system as long as the M_Key value retrieved via the SMP operation is not used and the operation has no other side effect (including no M_Key violation trap generation).

In accordance with an embodiment of the invention, the system can upgrade current secret M_Key in a fully operational subnet. The new secret M_Key policy can be installed on all network switches with SM enabled, e.g. via a smsubnetprotection transaction, to initially install secret M_Key.

When the update transaction is committed, the new current M_Key can be available to all enabled SMs, and the current Master SM can start using the new current M_Key. When the SM level update transaction is completed, the new current M_Key value can be installed by the master SM on all nodes. For example, when "localmkeypersistence" is enabled on the NM2 switches in the configuration, the current secret M_Key (e.g. the switch chip level configuration) can be persistently recorded on all switches in the system (i.e. including the switches without SM or with SM disabled).

Using this scheme, there may not be any interrupted service in the system, because the SMs can always be synchronized on legal M_Key values, and there may never be a race when an M_Key on the switch chip is upgraded to a value that the current master SM does not know.

Furthermore, the system can set a local secret M_Key value 111 on the switch chip 104, to a value that is not (yet) part of the list of known values for the SMs in the fabric, resulting in that the network switch 101 becoming "not visible" in the subnet. Also, the SM may not include the network switch 101 in the topology. Thus, any existing (local) routes through a leaf switch between directly connected hosts or between hosts or gateways (GWs) can remain operational, but with the external traffic disabled.

Additionally, the system can change an existing secret M_Key using a procedure similar to the initialization case. The difference is that, for the SMs, the system can add the new M_Key value to a list of known M_Keys, in addition to marking the new value as "current". When the new M_Key is active, the master SM can probe ports that have secret M_Key with both the new current value and (all) the known historical values. Then, the subnet can converge to a state where all ports can have the new current M_Key value.

Figure 2:
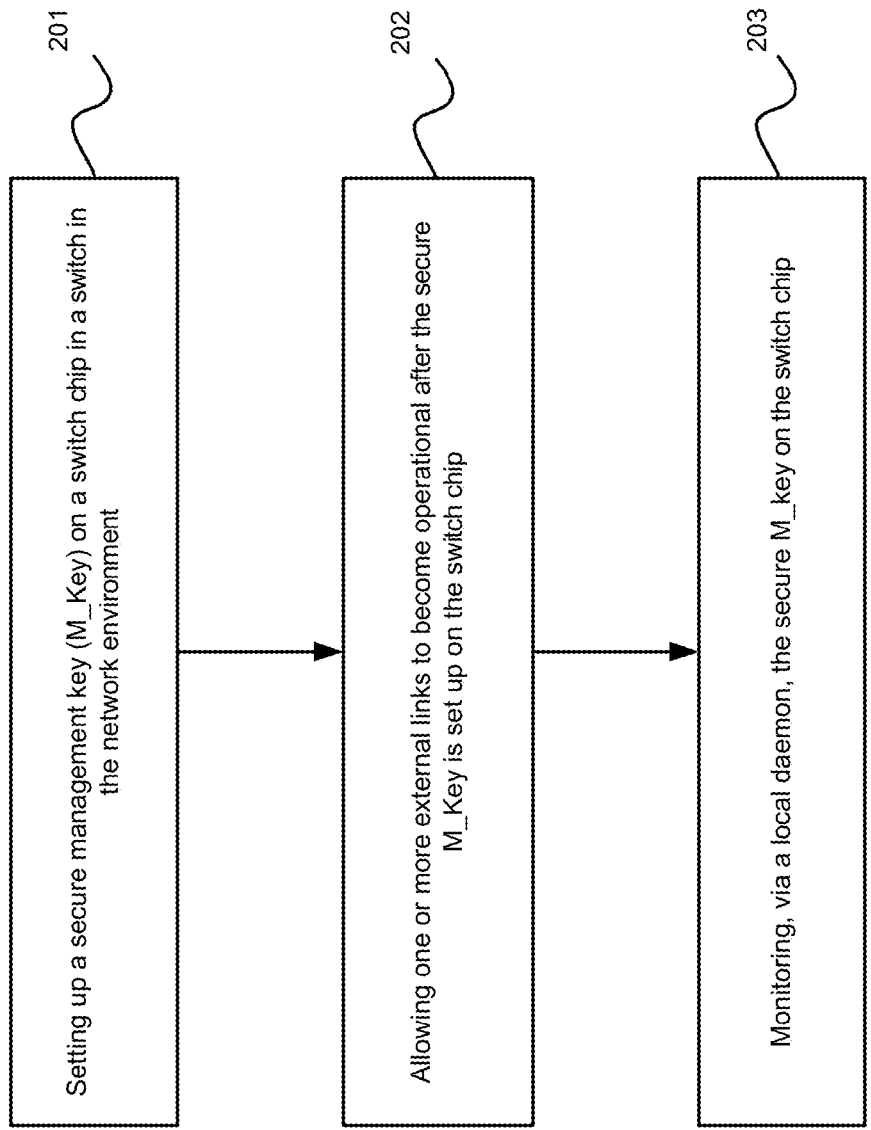
FIG. 2 illustrates an exemplary flow chart for supporting a persistent secure M_Key in a network environment, in accordance with an embodiment of the invention.

FIG. 2 illustrates an exemplary flow chart for supporting a persistent secure M_Key in a network environment, in accordance with an embodiment of the invention. As shown in FIG. 2, at step 201, the system can set up a secure management key (M_Key) on a switch chip in a switch in the network environment. Then, at step 202, the system allows one or more external links to become operational after the secure M_Key is set up on the switch chip. Furthermore, at step 203, a local daemon can monitor the secure M_key on the switch chip.

Subnet Discovery and Master Negotiation

In accordance with an embodiment of the invention, a subnet manager (SM) can perform subnet discovery, e.g. when it has a non-empty list of known M_Key values (trusted and un-trusted). The SM can treat a port with an unknown secret M_Key, or a port with no secret M_Key, to not be a part of the local subnet, and may not attempt any discovery beyond this port.

Figure 3:
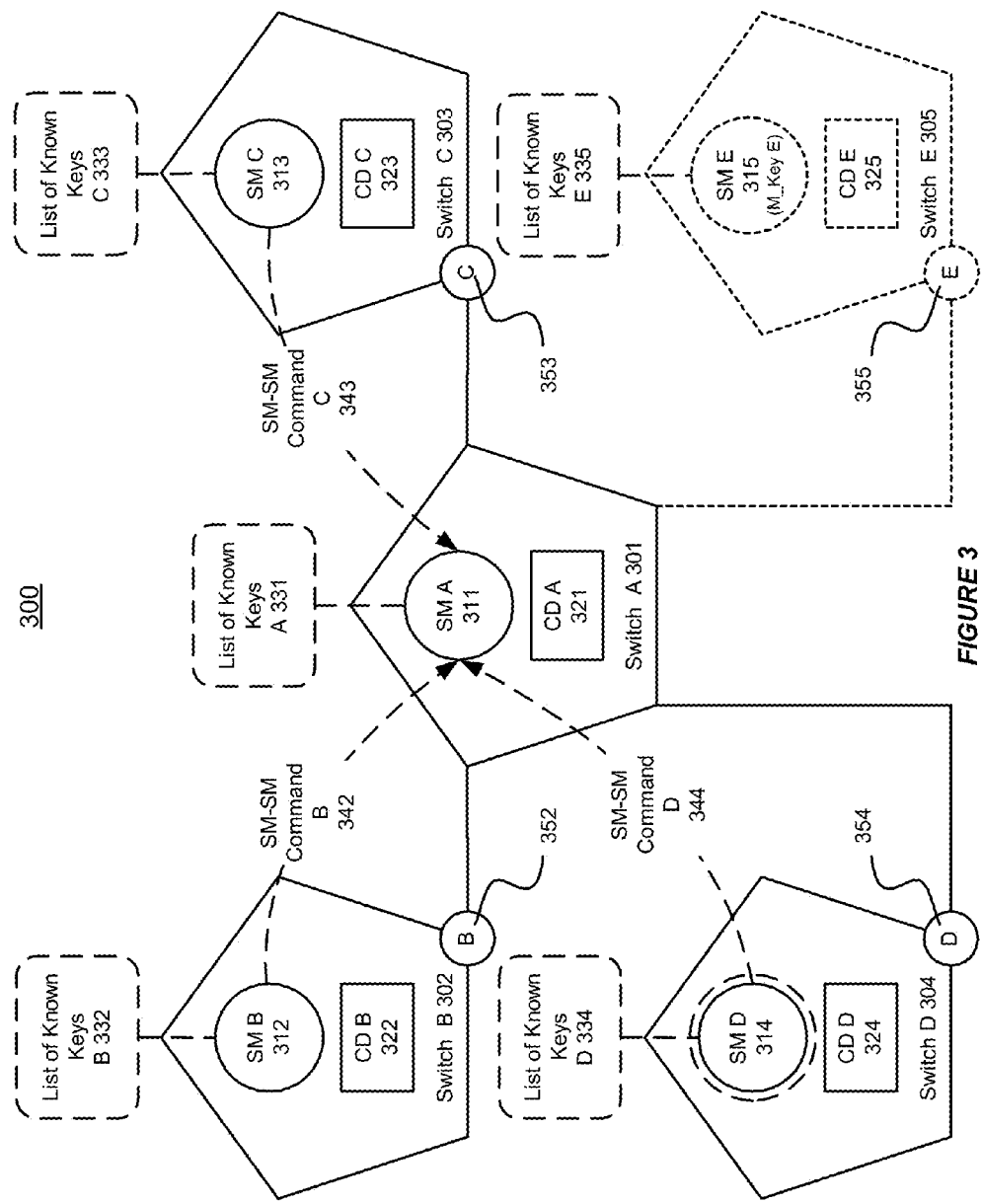
FIG. 3 shows an illustration of supporting master negotiation in a network environment, in accordance with an embodiment of the invention.

FIG. 3 shows an illustration of supporting master negotiation in a network environment, in accordance with an embodiment of the invention. As shown in FIG. 3, a plurality of switches, e.g. switches A-E 301-305, can be interconnected via an IB network 300. Furthermore, a plurality of subnet managers (SMs), e.g. SMs A-E 311-315, can reside on the different switches A-E 301-305. Each of the SMs A-E 311-315 can use a list of known M_Key values, such as the lists of known keys A-E 331-335, which can be trusted and/or un-trusted M_Key values. Additionally, each of the switches A-E 301-305 can include a configuration daemon (CD), e.g. CDs A-E 321-325.

Furthermore, the system can consider a remote port in the subnet 300 to be associated with an link up state when it has a known M_Key. This criterion can be used to simplify the subnet management logic for supporting consistent handling of secret M_Keys.

As shown in FIG. 3, SM A 311 can perform subnet discovery, since it has a non-empty list of known M_Key values A 131. For example, SM A 311 can consider reachable ports B-D 352-354 as part of the discovered topology, when the corresponding subnet management agents (SMAs) can pass a set of sanity checks, and the ports can be associated with either no M_Key, a readable M_Key, or a secret M_Key value that is included in the local list of currently known "trusted" or "un-trusted" M_Key values.

Also as shown in FIG. 3, when SM A 311 reaches port E 355, which is a port associated with an unknown M_Key E, SM A 311 can detect that the port E 355 is associated with a down link, which is not operational. Thus, SM A 311 can consider port E 355 as not part of the local subnet and may not attempt any discovery beyond the port E 355.

In accordance with an embodiment of the invention, the SMs A-D 311-314 in the local subnet can perform master negotiation. As shown in FIG. 3, SM A 311 can obtain information on the number of known M_key values from the other SMs B-D 312-314 in the local subnet.

The master negotiation can take into account the set of known M_Keys associated with each SM, in order to ensure that the elected master is the instance that has the best ability to manage the complete subnet relative to known/used M_Key values. For example, a SM in master negotiation can elect a SM with the largest number of known keys can become the master SM.

As shown in FIG. 3, when different SMs A-D 311-314 all have enabled secret keys, the SMs A-D 311-314 can use the SM-SM commands B-D 342-344 to check for the number of known secret keys from the remote SM. The SMs A-D 311-314 can also use SM information queries in order to check if all locally known SM_Key values are also known by the remote side (i.e. if the remote side has the same or more known values). If the remote SM has less known M_Key values, then the values known by the remote SM should also be known locally. When these requirements are fulfilled, the SM with the largest number of known keys, e.g. SM D 314, can become the master.

Figure 4:
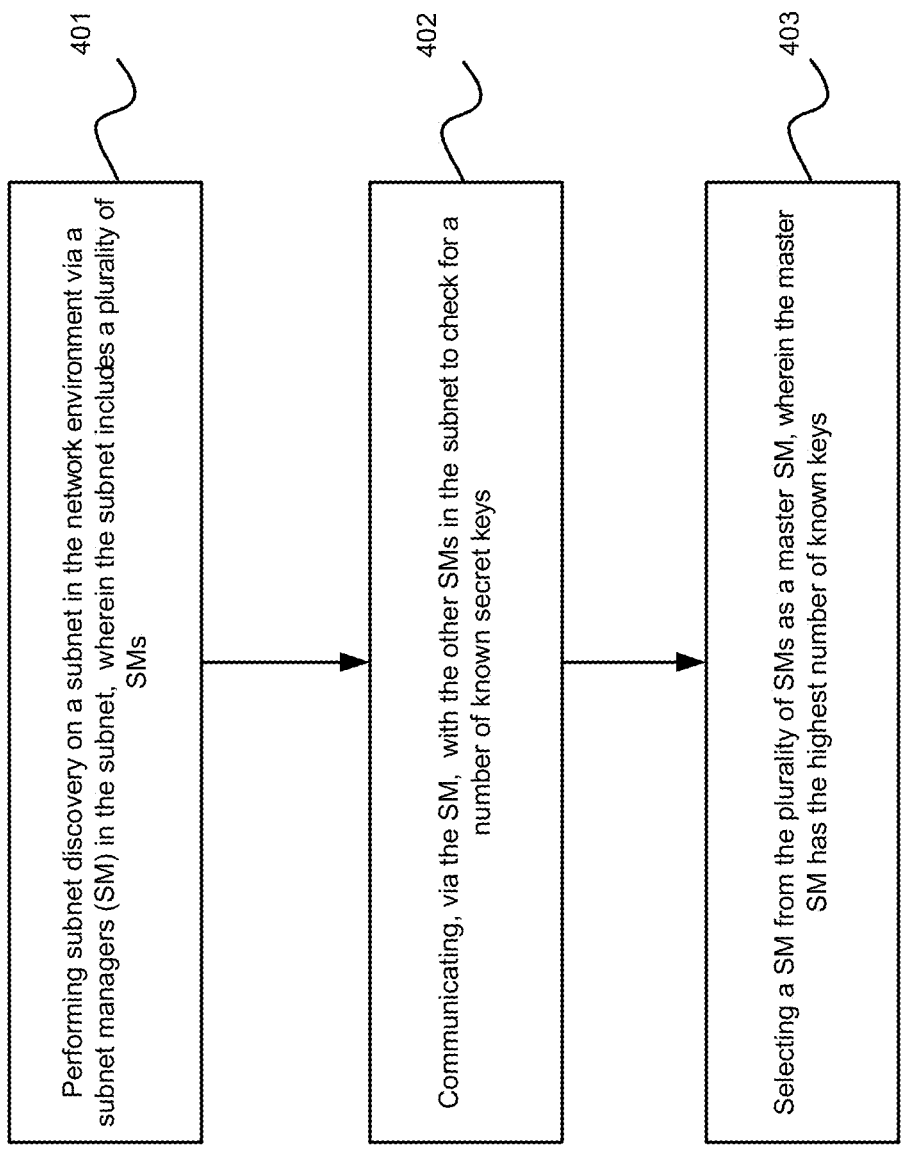
FIG. 4 illustrates an exemplary flow chart for supporting master negotiation in a network environment, in accordance with an embodiment of the invention.

FIG. 4 illustrates an exemplary flow chart for supporting master negotiation in a network environment, in accordance with an embodiment of the invention. As shown in FIG. 4, at step 401, the system can perform subnet discovery on a subnet in the network environment via a subnet managers (SM) in the subnet, wherein the subnet includes a plurality of SMs. Then, at step 402, the SM can communicate with the other SMs in the subnet to check for a number of known secret keys. Furthermore, at step 403, the system can select a SM from the plurality of SMs as a master SM, wherein the master SM has the highest number of known keys.

SM Priority/GUID

In accordance with an embodiment of the invention, the SM priority/GUID can be used for enhancing the master negotiation. For example, the SM priority/GUID based selection can be used as a tie breaker when there is a tie as the result of the secret M_Key based negotiation. Also, the SM priority/GUID based selection can be used in a transient state during the execution of an enable/disable transaction or a temporary stable state following a failure of an enable/disable transaction.

Furthermore, when there are different firmware revisions in the IB subnet, the master election can be defined based on whether the secret keys are enabled or not for the SMs. If secret keys are not enabled (i.e. not configured or currently disabled), then all master negotiation can take place using the best priority/GUID based selection, which may include the SMs at both trusted and un-trusted ports. On the other hand, a SM with the secret keys enabled can ignore other SMs at un-trusted ports, or other SMs with an earlier version of firmware, even if the other SMs (i.e. not secret key enabled) may have higher priority/GUID.

Additionally, there can be cases where some SMs have secret key enabled and some SMs have secret key disabled. This may represent a transient state during the execution of an enable/disable transaction, or a (temporary) stable state following the failure of an enable/disable transaction (e.g. when current master SM/PD switch node dies in the middle of the transaction).

Figure 5:
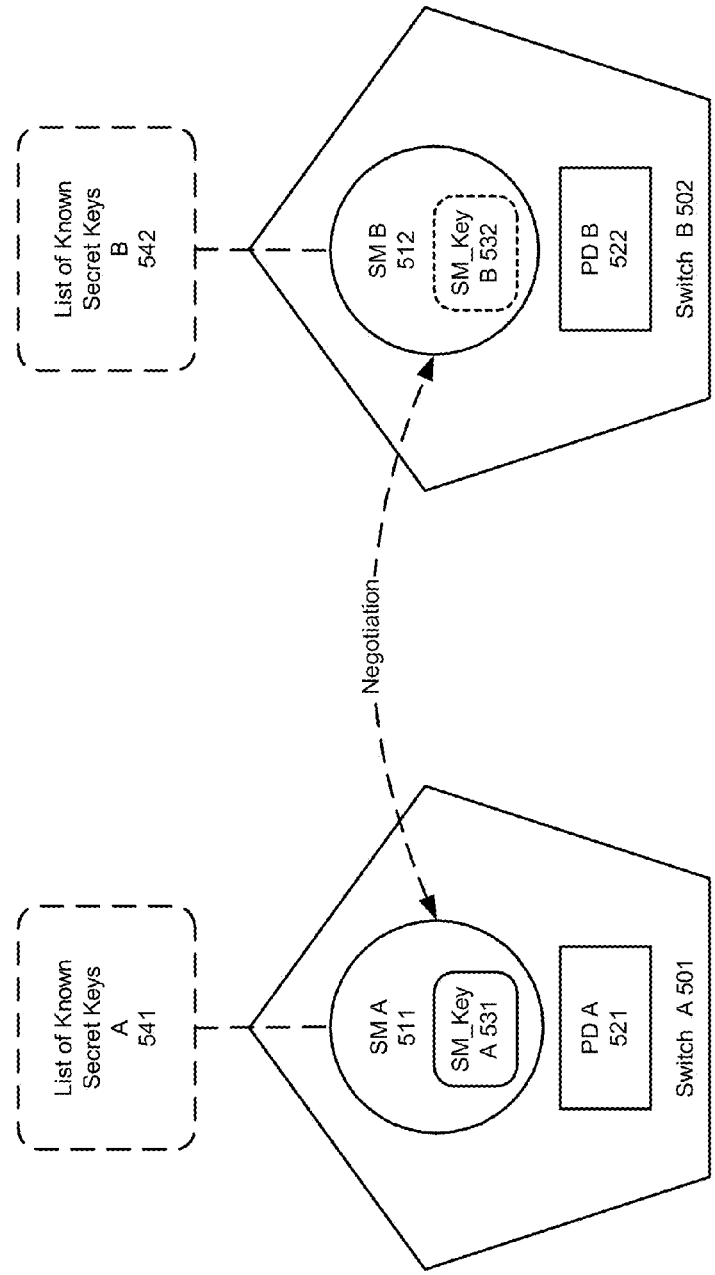
FIG. 5 shows an illustration of supporting master negotiation between the subnet managers during a transient state in a network environment, in accordance with an embodiment of the invention.

FIG. 5 shows an illustration of supporting master negotiation between the subnet managers during a transient state in a network environment, in accordance with an embodiment of the invention. As shown in FIG. 5, a plurality of subnet managers (SMs), e.g. SMs A-B 511-512, and a plurality of configuration daemons (CDs), or partition daemons (PDs), e.g. PDs A-B 521-522, can reside on the different switches A-B 501-502 in an IB subnet 500. Furthermore, SM A 511 can use a list of known keys A 541, while SM B 512 can use a lists of known keys B 542.

In accordance with an embodiment of the invention, the system can make sure that master election between SM A 511 and SM B 512 is taking place according to the involved SM priorities/GUIDs. As shown in FIG. 5, SM A 511 is a SM with the use of secret key (e.g. SM_Key A 531) enabled, while SM B 512 is a SM with the use of secret keys (e.g. SM_Key B 532) disabled.

The enable/disable transaction can be initiated in a situation where all SM node switches are in a consistent state, i.e. when all SM nodes have the exact same, consistent secret key configuration prior to initiating the enable/disable transaction. Then, the master selection criteria can be entirely based on the involved SM priorities/GUIDs. Also, since the enable/disable operation with this consistent initial state may not change the set of known keys for any SM on the SM node, the master election criteria can be based entirely on the involved SM priorities/GUIDs also after a completed or interrupted enable/disable transaction.

The SM B 512, which has a disabled SM_Key B 532, can send standard SM-SM requests without any secret SM_Key in order to retrieve priority info from any discovered SM. On the other hand, the SM A 511, which has an enabled SM_Key A 531, can respond to these requests without exposing any local secret key, but with correct priority information. Thus, the SM B 512 can correctly determine which node should become the master after having completed the discovery.

As shown in FIG. 5, SM A 511, with enabled use of secret keys, can discover the SM B 512, with disabled use of secret keys, as normal. Then, SM A 511 can send both the SM-SM requests and other requests containing its secret SM_Key values, based on determining that SM B 512 represents a trusted SM location. The SM B 512 can then respond with the correct number of known keys as well as the correct (same) secret SM_Key values as in the incoming requests. Based on such information, SM A 511 can make a correct selection of which SM node should be the master, e.g. based on priority/GUID, after completing the discovery process.

In the case where an inconsistent secret key configuration exists between the involved SM nodes, a SM with secret keys enabled can ignore another SM with secret keys disabled if it has less or not completely overlapping key values. The resulting operation and subnet state can depend on to what extent the currently used M_Keys is known by both SMs or only by the SM with enabled secret keys.

If both SMs know the current values, then the subnet state may not converge to a stable state and instead both SMs can become the master and update the master SM information for discovered ports, so that a non-deterministic and potentially oscillating master SM state may be observed in the subnet.

When the SM with disabled secret keys does not know the current M_Keys, the SM with enabled secret keys eventually conquer the subnet, by setting M_Keys that can cause the SM with disabled secret keys to eventually observe an empty subnet. The SM with disabled secret keys can no longer discover any port (including the local "SM port") as being manageable in terms of current secret M_Key. In such a case, the SM that observes an empty subnet can continually generate SMPs to discover and (attempt to) initialize the subnet.

Additionally, it is also possible that the SM with enabled use of secret keys may determine that the SM with disabled use of secret keys should be the master since the SM with disabled use of secret keys may have more known keys, whereas the SM with disabled use of secret keys determines that the SM with enabled use of secret keys should be the master based on priority/GUID evaluation. Thus, this can cause the subnet in a state without master, when both SMs consider the other should be the correct master and both SMs enter standby state.

Partition Configuration Valid State

In accordance with an embodiment of the invention, in order to ensure that the elected master SM has a valid partition configuration, the system can take the SM partition configuration valid state into account as a criterion for master negotiation.

Otherwise, if the partition configuration is not valid and the partition configuration state is not considered during the master election process, the SM may remain in a special wait mode until the partition daemon instructs it to continue with a consistent configuration. Thus, the subnet may not have an operational master, even when other SMs could have served as master with a valid configuration.

Figure 6:
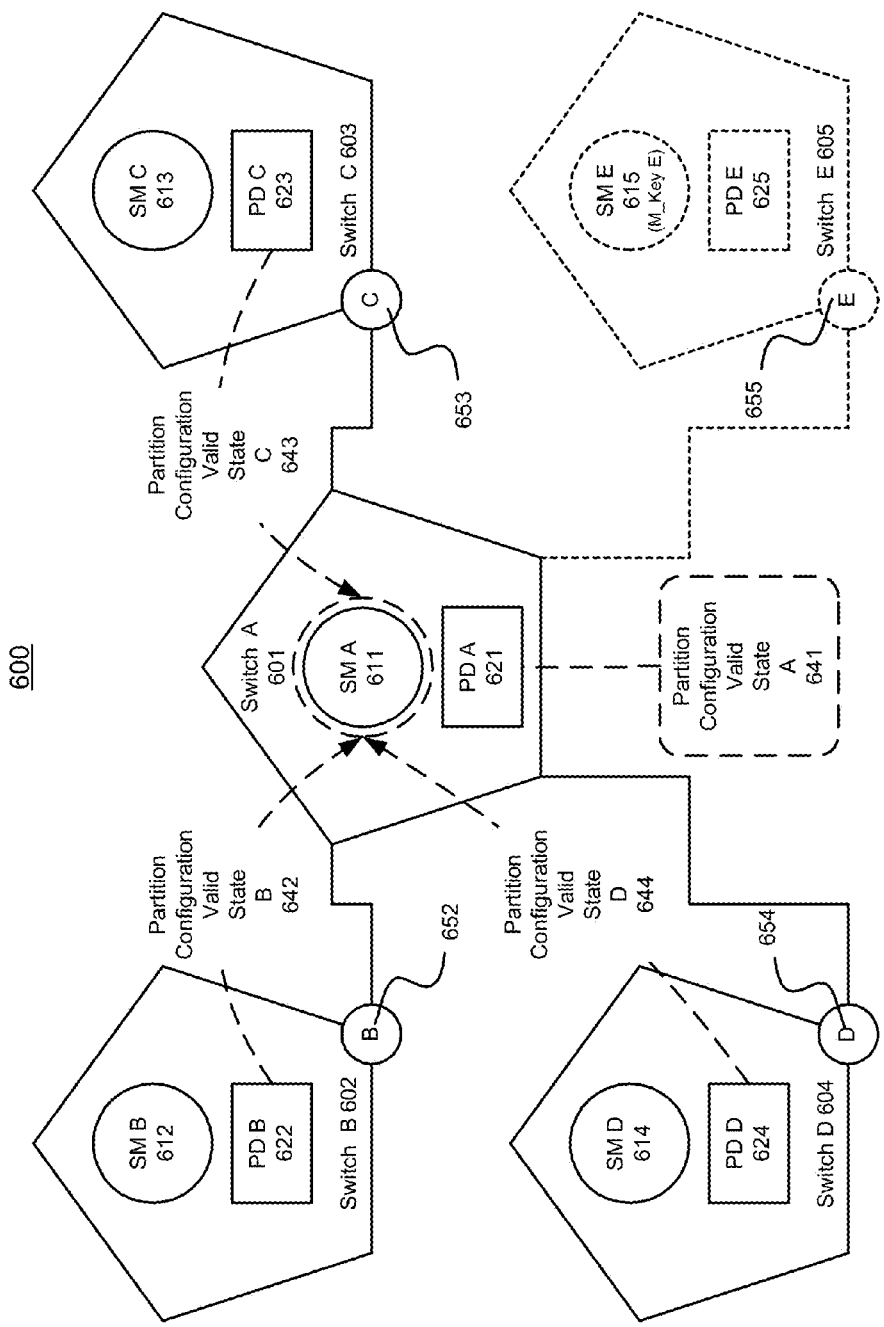
FIG. 6 shows an illustration for performing master negotiation based on partition configuration valid state in a network environment, in accordance with an embodiment of the invention.

FIG. 6 shows an illustration for performing master negotiation based on partition configuration valid state in a network environment, in accordance with an embodiment of the invention. As shown in FIG. 6, a plurality of switches, e.g. switches A-E 601-605, can be interconnected via an IB network 600. For example, switch A 601 can connect to switches B-E 602-605 via ports B-E 652-655 and perform subnet discovery.

Furthermore, a plurality of subnet manager (SM), e.g. SM A-E 611-615, and a plurality of configuration daemons (CDs), or partition daemons (PDs), e.g. PDs A-E 621-625, can reside on the different switches A-E 601-605. Each of the SM A-E 611-615 can maintain a list of known M_Key values, trusted and un-trusted.

In accordance with an embodiment of the invention, the system can include SM partition configuration valid state as part of the master election algorithm. Thus, the elected master SM A 611 can have the most comprehensive secret key configuration, and also have a valid partition configuration.

As shown in FIG. 6, the SM A 611 can synchronize with the partition daemon (PD) A 621 to get both the current secret key information and current valid state for the partition configuration, prior to initiating the initial discovery upon startup. Also, the partition configuration valid states A-D 641-644 can be communicated via a SM-SM command in a way similar to how the information about the number of secret keys is communicated. Furthermore, the partition daemons A-D 621-624 can use an asynchronous interface to signal any change in the partition configuration valid state to the local SM during run-time independently of the state of the local SM.

Additionally, the partition configuration valid state can be considered as a master negotiation criterion, in an order after the secret key state but before the priority and GUID evaluation. I.e., the partition configuration valid state may be considered only when the secret key state is inconclusive, or draw. Thus, the SM with valid partition configuration can be elected as the master, when the other SMs have invalid partition configuration.

In an IB network, the partition configuration can exist in a transient state during update transactions. For example, when current configuration is disabled during the distributed update transaction on the local master before it is disabled on the peer standby SM nodes, a standby peer may still have valid configuration. In accordance with an embodiment of the invention, the system can prevent the standby peer from winning an election process taking place concurrently with the update transaction, and can ensure that the mastership may not be handed over to the standby peer in a transient state.

Figure 7:
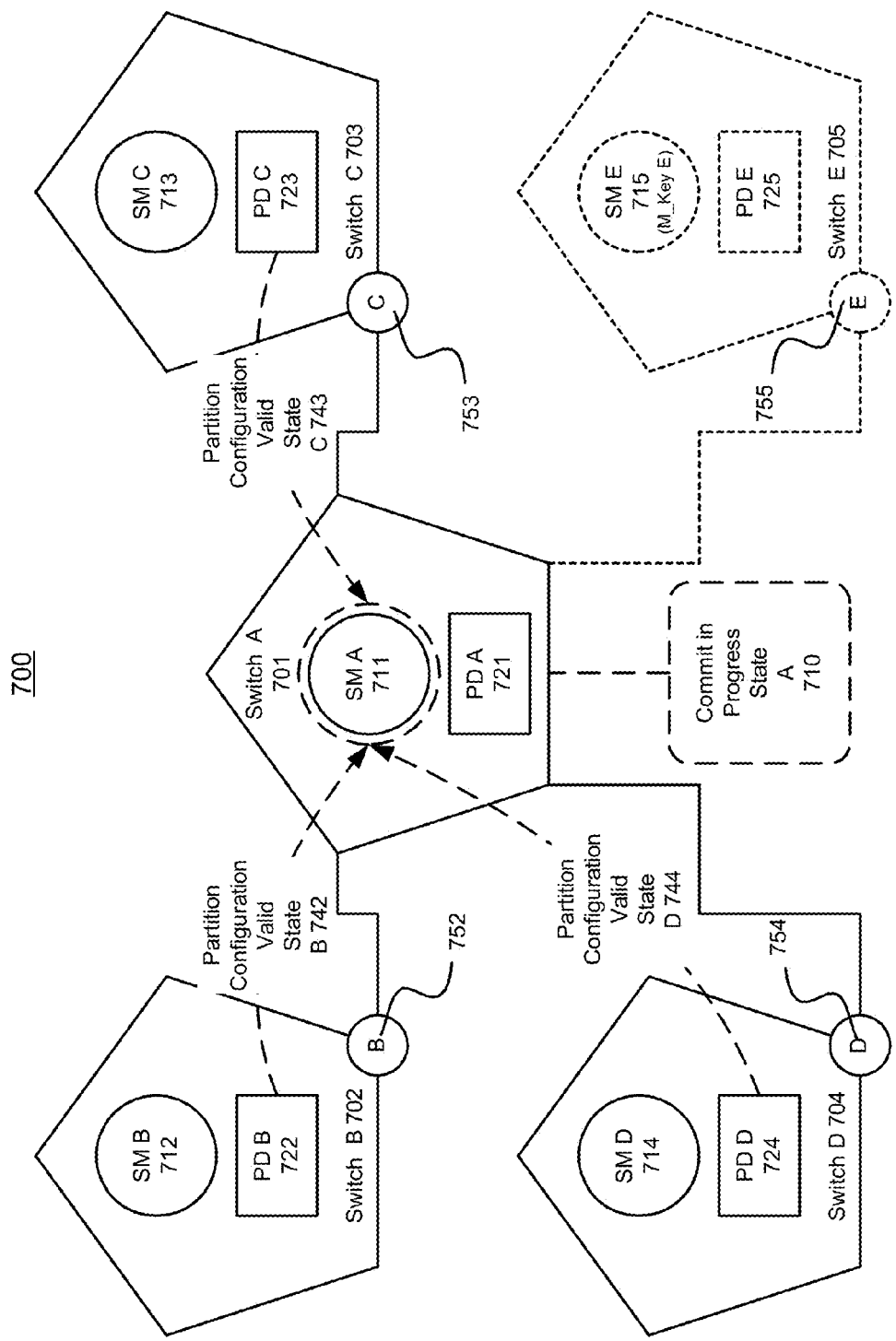
FIG. 7 shows an illustration for performing master negotiation based on the commit in progress state on a master SM in a network environment, in accordance with an embodiment of the invention.

FIG. 7 shows an illustration for performing master negotiation based on the commit in progress state on a master SM in a network environment, in accordance with an embodiment of the invention. As shown in FIG. 7, a plurality of switches, e.g. switches A-E 701-705, can be interconnected via an IB network 700. For example, switch A 701 can connect to switches B-E 702-705 via ports B-E 752-755 and perform subnet discovery.

Furthermore, a plurality of subnet manager (SM), e.g. SM A-E 711-715, and a plurality of configuration daemons (CDs), or partition daemons (PDs), e.g. PDs A-E 721-725, can reside on the different switches A-E 701-705. Each of the SM A-E 711-715 can maintain a list of known M_Key values, trusted and un-trusted.

As shown in FIG. 7, the system can configure the PD A 721 to communicate the start and completion of the commit operation to the local master SM A 711. Then, this transient commit in progress run-time state 710 can then be provided by the master SM A 711 along with the partition configuration valid state via the SM-SM command. Also, the master SM A 711 can receive partition configuration valid states B-D 742-744 from the peer nodes.

Thus, the master election algorithm can take in account the commit in progress state 710, such that if commit in progress state is true, then the master election result is the same as if the partition configuration valid state is true for the master SM A 711. For example, the master election algorithm can ignore partition configuration valid state on the current master SM A 711, during the execution of the update transaction.

In accordance with an embodiment of the invention, the current master SM A 711 can hide the existence of the commit in progress state from the peer SMs B-D 712-714, by signaling that the partition configuration valid state is true to peer standby SMs B-D 712-714 when the commit in progress state 710 is true locally. Alternatively, the commit in progress state 710 can also be included in the SM-SM protocol, in order to facilitate explicit logging of all relevant state.

Additional Master Negotiation Criteria

In accordance with an embodiment of the invention, additional criteria can be defined to evaluate how well suited an SM instance is to become the master SM in a subnet, and these criteria can be included in an ordered list for use in the master election protocol.

The master election procedure can take into account additional parameters identifying various properties representing the ability for a particular node or SM instance to operate successfully as the master. Such aspect can include the ability to communicate on all relevant management networks, any degraded nature of the local node or IB connectivity. This information can be represented explicitly as an ordered list of parameters that each could be compared to, or they could be translated into a "fitness score" or be included as a delta increase or decrease in the configured SM priority of the relevant SM instance.

For example, the master election algorithm can take into account the factor of having the most recent configuration (either partition or secret key), when different SM nodes become available in a state where they have valid configurations, but are not in synchronization about the configuration versions.

Furthermore, the system can use secret key configuration to fence unavailable SM nodes with stale configuration and make sure that old known keys are not deleted as long as currently unavailable SM nodes may have such known keys as part of their configuration. Thus, the secret key based master election process may always ensure that one of the SM nodes with the most recent configuration policy becomes the master. This may always be the case since the secret key information takes precedence during master election, and any valid administration procedure can ensure that current partition configuration is in synchronization with the most recent secret key configuration. Also, if a remote SM is ignored due to current secret key configuration, then partition configuration valid information is also ignored relative to master election. Thus, there may be no inherent need to make the configuration version number a parameter of the master election algorithm.

Additionally, there may also be a need to consider the inconsistent state, where one or more SM nodes with invalid partition configuration may have a longer list of known M_Keys, while one or more SM nodes with valid partition configuration may have a shorter list of known M_Keys. In this situation, the system may elect a master that is not able to make the subnet operational and respond to SA requests.

In accordance with an embodiment of the invention, more elaborate schemes can be used to automatically handle the above situation. These schemes can be based on determining the most up-to-date configuration, using majority voting among the involved CD instances, e.g. the various consensus and quorum based voting algorithms.

Subnet State Handling

In accordance with an embodiment of the invention, the system can ensure that the operational state of a subnet is not compromised by one or more degraded configurations or single transaction failures. For example, the subnet can remain under a single master, which is well defined based on various master negotiation criteria.

Furthermore, there can be no change of the master SM as a result of a disable or enable operation, since the disabling and enabling use of secret M_Keys does not change the list of known M_Keys nor the SM priority or GUIDs. Also, the updates of known or current M_Key value(s) may not trigger an initiation of any subnet discovery operation, since the secret M_Key update transaction logic ensures that the master SM election criteria is maintained during the complete transaction.

An SM with enabled secret M_Keys can ignore any SM with disabled secret M_Keys, or any SM that has not been configured with secret M_Keys. Thus, the state of the subnet can converge to a state with the SM with secret M_Keys enabled being the master SM, independently of whether the other SM consider that it should be master due to priority/ GUID relationships. Also, an update of secret key configuration may not trigger the master SM to initiate any discovery or re-evaluate any relationships with other SMs.

Additionally, a single transaction failure may not compromise the operational state of the subnet, since a single failed update transaction may not be able to bring the fabric into a state where different active SM instances can have non-overlapping sets of known M_Keys and/or conflicting current M_Key values.

The master election can take place with the secret key state as part of the election criteria. Also, the master SM can continue to sweep the subnet at regular intervals, and can trigger further discovery if new ports can be managed based on updated M_Key information or if some ports can no longer be managed (e.g. due to an administrator error).

On the other hand, any change in physical connectivity (or link states) can trigger the re-discovery by the current master SM. The discovery of new SMs or SMs with changed priority, by the master SM, can trigger re-evaluation of mastership in the subnet, while the standby SMs can continue monitoring the current master, but may not trigger any new discovery as long as the current master is operational.

In order to ensure that the SM mastership is not handed over to an un-trusted SM and also not handed over to any trusted SM that does not have the most recent M_Key configuration, the trusted SMs may not engage in a master negotiation with SM instances that is not trusted and that does not have the current SM_Key value. Thus, the SM with stale M_Key configuration will not be able to manage nodes that already have been set up with the most recent M_Key value.

Furthermore, the trusted SM can continue its discovery and become the master in the part of the subnet that it can manage. Also, a subnet with multiple SMs, which does not have the same current M_Key configuration, can eventually be conquered by the SM that has the most recent configuration, e.g. when the other SMs with stale configuration have a current M_Key value that is included in the list of known M_Key values of the SM with the most recent configuration.

Furthermore, in order to reduce the risk of such inconsistent configurations, attempts to update the M_Key configuration can be performed in a force mode, if the partition configuration is not in synchronization among the SM nodes.

Subnet Manager (SM) Start or Wake up

In accordance with an embodiment of the invention, the system can ensure appropriate state handling during the start or wake up of a SM.

Figure 8:
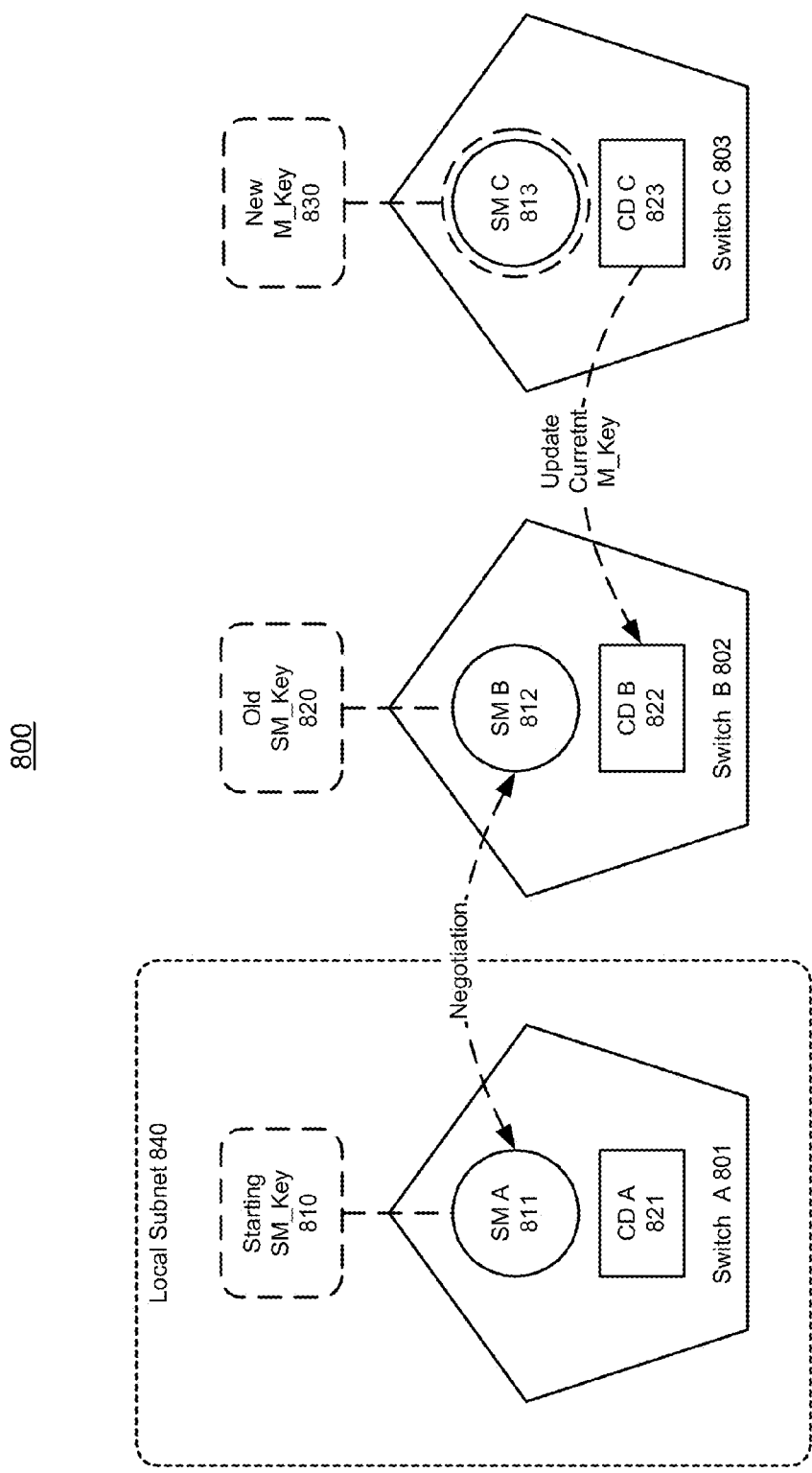
FIG. 8 shows an illustration for handling a SM start in a network environment, in accordance with an embodiment of the invention.

FIG. 8 shows an illustration for handling a SM start in a network environment, in accordance with an embodiment of the invention. As shown in FIG. 8, an IB network 800 can include a plurality of switches, e.g. switches A-C 801-803, with different configuration daemons (CDs), e.g. CDs A-C 821-823.

A SM A 811 on switch A 801 can start from scratch and can perform subnet discovery, which leads the starting SM A 811 to reach switch B 802 with a SM B 812. The switch B 802 can have an old M_Key 820 because the current master SM C 813 on switch C 803 has not yet set up the new current M_Key 820 on the switch B 802.

Then, the SM-SM negotiation can be initiated. Since the starting SM A 811 has not yet received the M_Key list update, the SM_Key 820 provided by the remote SM B 812 is unknown to the starting SM A 811. On the other hand, the remote SM B 812, which has the updated known list, can recognize the SM_Key 810 associated with the starting SM A 811 as being an older value in its local list.

Thus, when SM A 811 and SM B 812 have exchanged SM_Keys, they can both be able to tell that that the starting SM A 811 has an old SM_Key value since the remote SM has recognized the SM_Key of the starting SM A 811, and the starting SM A 811 can, at this point, determine that it knows the M_Key of the node (i.e. switch B 802) where the remote SM B 812 operates from.

However, from the perspective of the starting SM A 811, this condition can be transient, and the remote SM B 812 would appear as completely unknown to the starting SM A 811, after the remote master SM C 813 sets up the new current M_Key 830 value on the remote switch B 80.

Furthermore, if discovery by the starting SM A 811 is halted due to detecting unknown M_Keys "surrounding" it, then the starting SM A 811 can interpret this as a case of accidental subnet merge and can assume it should become master in its local subnet 840.

Figure 9:
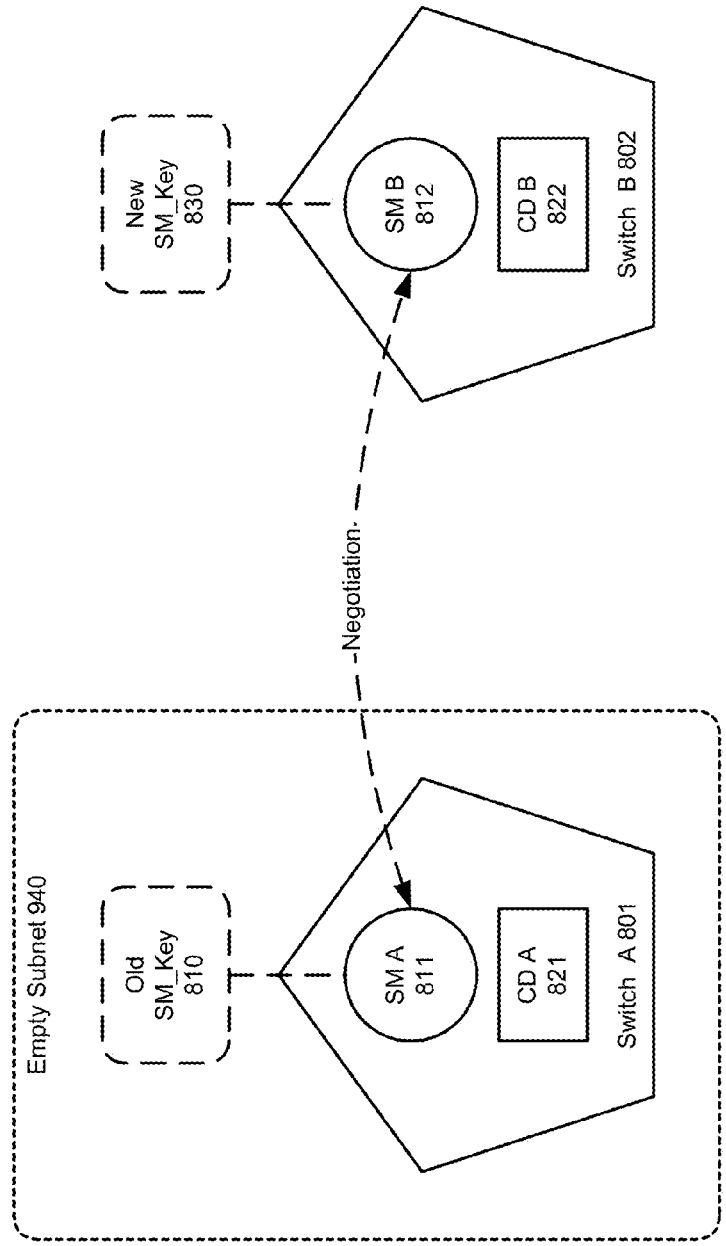
FIG. 9 shows an illustration for continuingly handling SM start in a network environment, in accordance with an embodiment of the invention.

FIG. 9 shows an illustration for continuingly handling SM start in a network environment, in accordance with an embodiment of the invention. As shown in FIG. 9, an IB network 900 can include a plurality of switches, e.g. switches A-B 801-802, with different configuration daemons (CDs), e.g. CDs A-C 821-823.

If SM A 811 has already been updated with a new current SM_Key 830, then SM B 812 can discover the starting SM A 811, and can initiate negotiations with the starting SM A 811. Thus, the starting SM A 811 can determine that SM B 812 has an un-known remote SM_Key, while the remote SM B 812 can determine that the starting SM A 711 has a known but "old" SM_Key 810.

Then, the remote SM B 812 with the new M_Key/ SM_Key 830 value can ignore the starting SM A 811 and conquer its territory by updating the M_Key in the nodes that have been controlled by the starting SM A 811. Eventually, the starting SM A 811 can only see an empty subnet 940 in terms of nodes that it can control and thereby effectively quiesce itself.

Additionally, when an SM instance, such as the starting SM A 7811, observes an empty subnet 940 due to the local port not being manageable because of unknown secret M_Key, then this SM A 811 can remain in discovery mode, and can be ready to receive configuration update from its local CD instance, e.g. CDA 821.

The SM B 812, which has the longer number of SM_Keys, can win the master election, when the smaller set of SM_Keys for the other SM (e.g. the starting SM A 811) is a real subset of the set of SM_Keys known by the master SM B 812.

Furthermore, an update transaction may be interrupted after the replication of known values, but before a new current value is defined (this includes also the cases of interrupted disable/enable operations). In these cases, the implicit negotiation that only takes the current SM_Key value into account may end up with two master SMs, since both SM instances have the same known key lists and both SM instances are able to discover all nodes. Then, the system may not converge to a state where the SM instance with the most recent configuration can conquer the whole subnet.

In order to handle this scenario, the system can use a master negotiation scheme that selects a single master that has the most recent configuration or is at least as capable as the other SM instances, in terms knowing the key values that are currently present in the system. Furthermore, the system can support the master negotiation scheme with the ability to determine secret key supported and enabled state via SM-SM operations.

Additionally, SM A 811, may wake up (e.g. after "time-warp") and think it is the current master in the local subnet. The SM may experience write failures due to new M_Key value in the fabric. This can lead to the SM A 811 performing a new subnet discovery. Also, SM A 811 may detect unknown M_Keys and trigger a new discovery, as a result of performing perform light sweep operations. In these scenarios, the new discovery operation may lead to similar scenarios as in the SM restart case.

Additionally, after a new switch A 801 is added into the network, the new SM A 811 may not become the master until it has received the current/updated policy information. In the case when the SM and PD enabled status are combined, the new SM A 811 can start out with reduced priority (i.e. using setsmpriority CLI command) and then have the priority adjusted via a dummy transaction. This dummy transaction can update both the partition and the M_Key configuration and can bring the new SM A 811 in synchronization with the current policy.

Alternatively, when the new SM A 811 does not have any SM level M_Key configuration, SM A 811 can be allowed to start with correct priority, since SM A 811 may be ignored by other SMs with enabled secret key configuration. Furthermore, SM A 811 may not become a master until it has been updated with correct M_Key policy.

Furthermore, the system can ensure that the partition configuration policy update take place prior to the update of secret key configuration, when the partitioning configuration state is not considered in the master election procedures. Here, by performing secret key configuration update after partition policy update, the secret key based master election control can ensure that the new SM is in synchronization, in terms of both partitioning policy and secret key configuration, before being eligible to become master.

In accordance with an embodiment of the invention, by installing secret M_Key prior to link training, e.g. using the "localmkeypersistence" CLI command, the system can handle any rough or accidentally started SM (i.e. a SM with incorrect policy and M_Key information) presented in a subnet where the secret M_Keys are used. Thus, the system can discover and ignore any host based SMs on "un-trusted" HCAs. Also, the system can ignore the SM-SM negotiation requests sent from an invalid SM due to SM_Key mismatch.

Accidental Connectivity

In accordance with an embodiment of the invention, the system can ensure appropriate state handling during the merging of different subnets.

Figure 10:
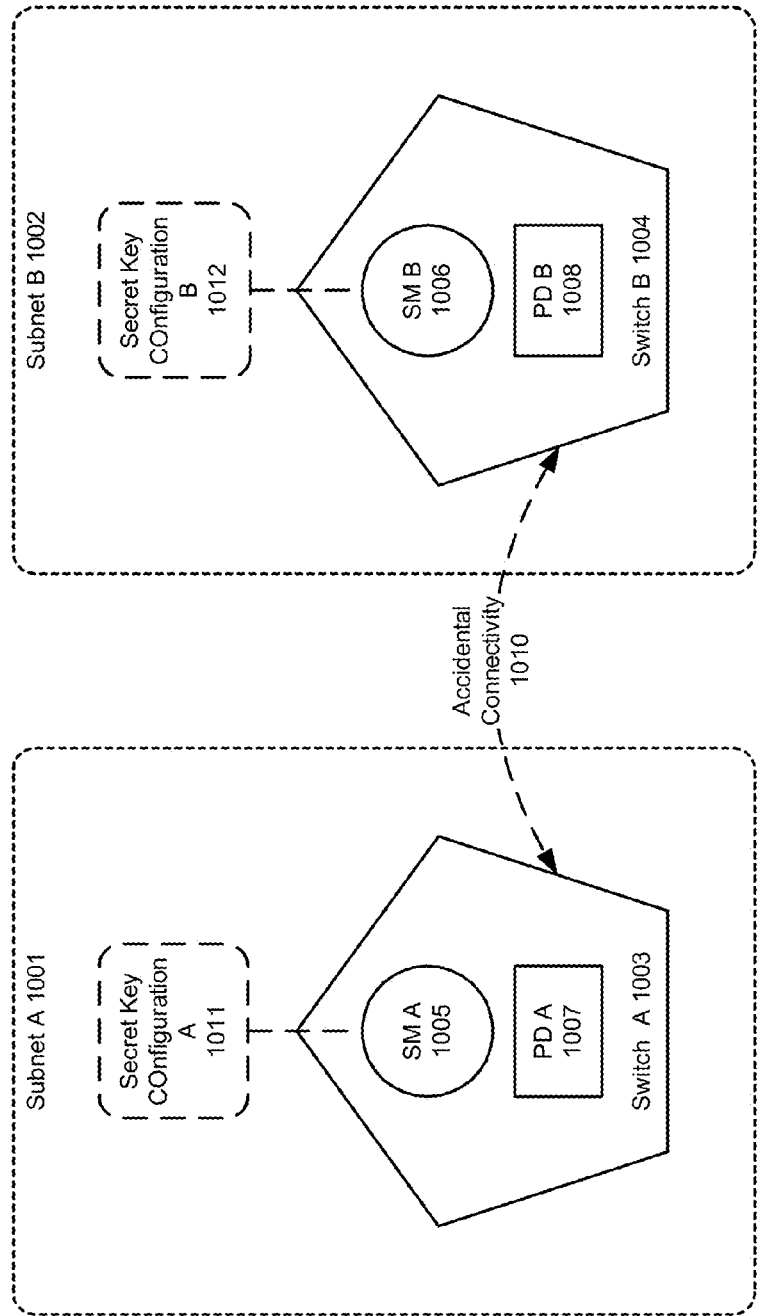
FIG. 10 shows an illustration for handling an accidental connectivity in a network environment, in accordance with an embodiment of the invention.

FIG. 10 shows an illustration for handling an accidental connectivity in a network environment, in accordance with an embodiment of the invention. As shown in FIG. 10, an IB network 1000 can include a plurality of subnets, e.g. subnets A-B 1001-1002. Furthermore, the subnet A 1001 can include a switch A 1003 with a master SM A 1005 and PD A 1007, while the subnet B 1002 can include a switch B 1004 with a master SM B 1006 and PD B 1008. Additionally, the subnet A 1001 and the subnet B 1002 can have non-overlapping secret M_Key configuration, such as the secret M_Key configuration A 1011 used by subnet A 1001 and secret M_Key configuration B 1012 used by subnet B 1002.

When the subnet A 1001 and the subnet B 1002 are accidentally connected, e.g. via an accidental connectivity 1010, both SM A 1005 and SM B 1006 can detect a remote port with an unknown M_Key. Then, both SM A 1005 and SM B 1006 can consider the link as equivalent to "down" and may not perform discovery beyond the link. Thus, subnets A-B 1001-1002 can continue to operate as before the accidental connectivity, and there may not be any issue with the SM-SM negotiation, since the discovery stops before any SM-SM contact/negotiation can be commenced.

Furthermore, the system can provide secure HCA firmware (including SMA) that is deployed on all HCAs (on hosts), and also can ensure that all switches are secure and trusted. Thus, the SMs A-B 1005-1006 can avoid expose the secret M_Key value being used during the probing phase, even without explicitly and actively authenticating the trustfulness of the remote SMA.

Figure 11:
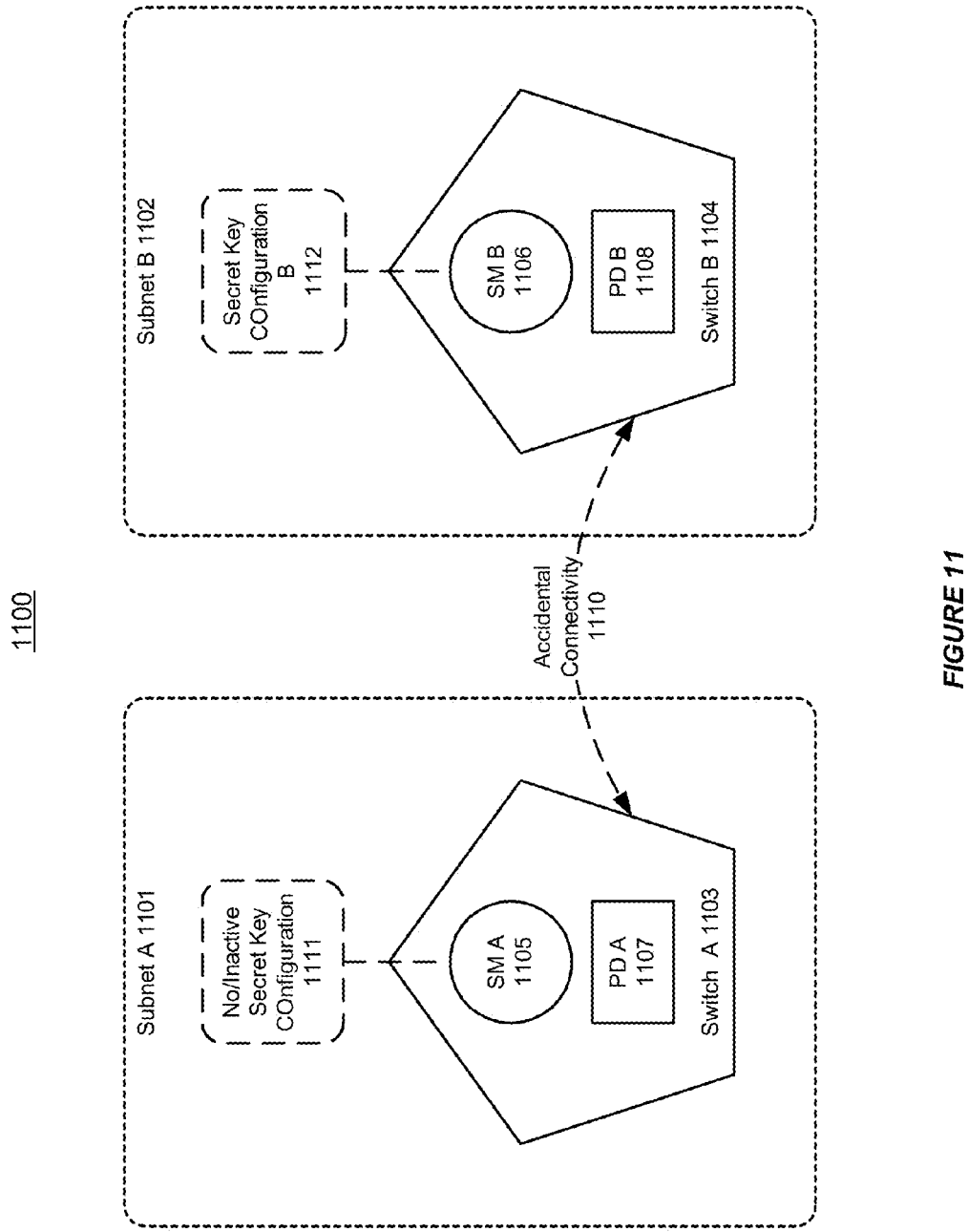
FIG. 11 shows an illustration for handling an adverse accidental connectivity in a network environment, in accordance with an embodiment of the invention.

FIG. 11 shows an illustration for handling an adverse accidental connectivity in a network environment, in accordance with an embodiment of the invention. As shown in FIG. 11, an IB network 1100 can include a plurality of subnets, e.g. subnets A-B 1101-1102. Furthermore, the subnet A 1101 can include a switch A 1103 with a master SM A 1105 and PD A 1107, while the subnet B 1102 can include a switch B 1104 with a master SM B 1106 and PD B 1108. Additionally, subnet B 1102 can be set up with a secret M_Key configuration B 1112, while subnet A 1101 has no secret M_Key configuration, or has an inactive secret M_Key configuration 1111.

When the subnet A 1101 and the subnet B 1102 are accidentally connected, e.g. via an accidental connectivity 1110, then the accidental connectivity between the two subnets may cause potential damage to the state of both subnets, since an invalid topology may have been discovered and the routing and initialization of both subnets A-B 1101-1102 may have become erroneous.

Furthermore, the secret M_Key configuration B 1112 in subnet B 1102 may allow SM A 1005 in subnet A 1101 to read various SMA information except the M_Key, while prohibiting any write operations. Thus, SM A 1105 in subnet A 1101 can perform discovery in the subnet B 1102, which has the secret M_Key protected part of the merged subnet. Here, SM B 1006, the master SM with active use of secret M_Key, can interpret subnet A 1111, the connected subnet with no secret M_Key, as just a hot-plugged new part of its own subnet relative to discovery and can perform discovery and determine whether it can manage the ports in the subnet A 1101.

In accordance with an embodiment of the invention, the system can provide the secret M_Key configuration with an option to define that a SM may require all switches to have an M_Key value that matches a value in the configured known list. Then, the SM may stop discovery if there is a mismatch, even if the current M_Key is readable and the switch node otherwise would have been deemed as manageable. Thus, the system can protect both subnets from any damage due to an accidental connectivity to a subnet that does not use secret M_Key configuration.

Furthermore, the system can take into consideration a known-topology, e.g. a already discovered and activated subnet topology, in order to avoid long lasting accidental outages after switch resets, in order to handle the situations where the current secret M_Key values are "lost" (i.e. reset to null) in a part of the local expected subnet topology.

On the other hand, the system can ensure that an existing M_Key may not be lost, unless there has been an administrator error, or a physical service action has replaced a network switch, e.g. via enabling the use of "localmkeypersistence" on all network switches. Thus, it may be possible to avoid any such outages without dependency on recognizing expected topology.

Additionally, using the above scheme, it may be possible to add a new switch to the physical subnet configuration, and be assured that the new switch may not be included in the active configuration until an explicit local action has been performed. For example, this local action can set the local secret M_Key to a value in the current known list for the existing "smnodes" in the subnet. Also, this scheme can be advantageous from the perspective of preventing user mistakes, since the above scheme requires an explicit action in order to have it included.

Alternatively, the system can configure an un-known secret M_Key prior to connecting the new switch to the operational subnet. This may require an explicit up-front action to prevent the new switch from being included.

Furthermore, the scheme, where a switch is not considered part of the active topology until it has a known secret M_Key, can be extended to allow full discovery of the complete physical subnet via only performing routing and initialization of the switches that already has a known secret M_Key. Additionally, a dry-run scheme, which will be discussed in the following section, can be employed to further improve the management of the complete physical subnet.

In accordance with an embodiment of the invention, when detecting the remote SM, the system can determine if the remote SM is trusted without exposing any local secret M_Key/SM_Key values.

The simplest scheme is to ignore "un-trusted" SMs. For example, a SM may not send any SM negotiation message to a remote SM as long as the remote SM has not "authenticated" itself by sending a valid SM_Key. On the other hand, for SMs behind ports defined as trusted, the system can initiate the SM-SM negotiation, while not giving up mastership if the remote SM does not have a SM_Key value list that matches the local list of M_Key/SM_Key values.

Additionally, the using of the node type for authenticating the remote SM can be restricted, since the SM-SM request may be received from nodes that have not yet been discovered. In this case, since the incoming SM-SM request may contain a SM_Key value, the request can be validated based on this value independently of the remote node type.

On the other hand, if the remote SM node is discovered before any SM-SM request has been received from it, then the node type can determine if an SM-SM negotiation request with the secret SM_Key is sent to it. Also, the SM-SM messages may not contain any secret M_Key value in order to reduce the exposure of these values in the case where a rough SM is allowed to operate on a node with trusted SMA.

In the case where the remote SM is not using M_Keys/SM_Keys and is ignored by the SM with secret M_Key, then the whole merged subnet will eventually be conquered by the SM with secret M_Key and the remote SM is then effectively made unable to influence the state of the subnet (except for "noise" in terms of generating discovery SMPs).

Furthermore, a rough or accidentally started SM, which has incorrect policy and M_Key information, can appear in a subnet where secret M_Keys are used. The system can ensure that secret M_Key installed prior to link training, e.g. being configured with "localmkeypersistence" enabled. Then, the host based SMs can be discovered on "un-trusted" host channel adaptors (HCAs) and be ignored immediately, or the invalid SM can try to send SM-SM negotiation requests and then be ignored due to SM_Key mismatch.

Dry-Run Mode for Subnet Discovery and Initialization

In accordance with an embodiment of the invention, the system can use dry-run subnet manager (SM) nodes to support complete physical subnet analysis and controlled subnet merge.

Figure 12:
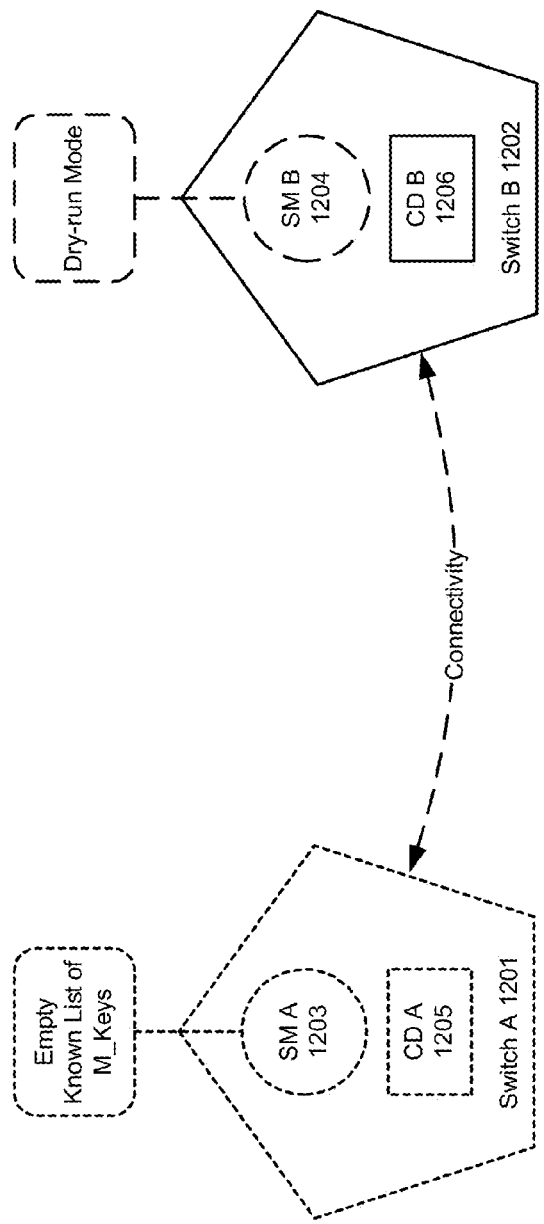
FIG. 12 shows an illustration for supporting a dry-run mode in a network environment, in accordance with an embodiment of the invention.

FIG. 12 shows an illustration for supporting a dry-run mode in a network environment, in accordance with an embodiment of the invention. As shown in FIG. 12, an IB network 1200 can include a plurality of switches, e.g. switches A-B 1201-1202. Switch A 1201 includes a SM A 1203 and a CD A 1205, while switch B 1202 includes a SM B 1004 and a CD B 1006.

Furthermore, the switch A 1201 has been set up with an unknown secret management key (M_Key), or has been set up with an empty known list of M_Keys. Thus, the switch A 1201 can be considered as an inactivated switch, from the perspective of the SM B 1204.

The system can use the SM B 1204, which is in a dry-run mode, for supporting the analysis of the complete physical subnet 1200 (including the inactivated switch A 1201). The administrator can perform dry-run routing operations, via the SM B 1204, to make sure that the total topology provides the required properties and connectivity before actually activating the additional switch A 1201.

Furthermore, in order to avoid the complexity of having both "production" and "dry-run" modes active in the same SM instance, the SM B 1204 can be an independent SM in a special dry run mode, outside the current SM nodes set.

Thus, the SM B 1204, which is in a dry-run mode, can complete the analysis, routing and the establishing of configuration and policy information for each port in the complete subnet 1200, without performing any actual update of the subnet.

Furthermore, in order to perform complete routing analysis for multi-subnet or multi-sub-subnet configurations, the dry-run mode can be used to perform complete routing analysis for the complete fabric. Here, the discovery of the complete fabric for multi-sub-subnet configurations is straight-forward, whereas, a proxy mechanism can be implemented by the router ports in order to allow the discovery across subnet boundaries in the case of multiple subnets.

Figure 13:
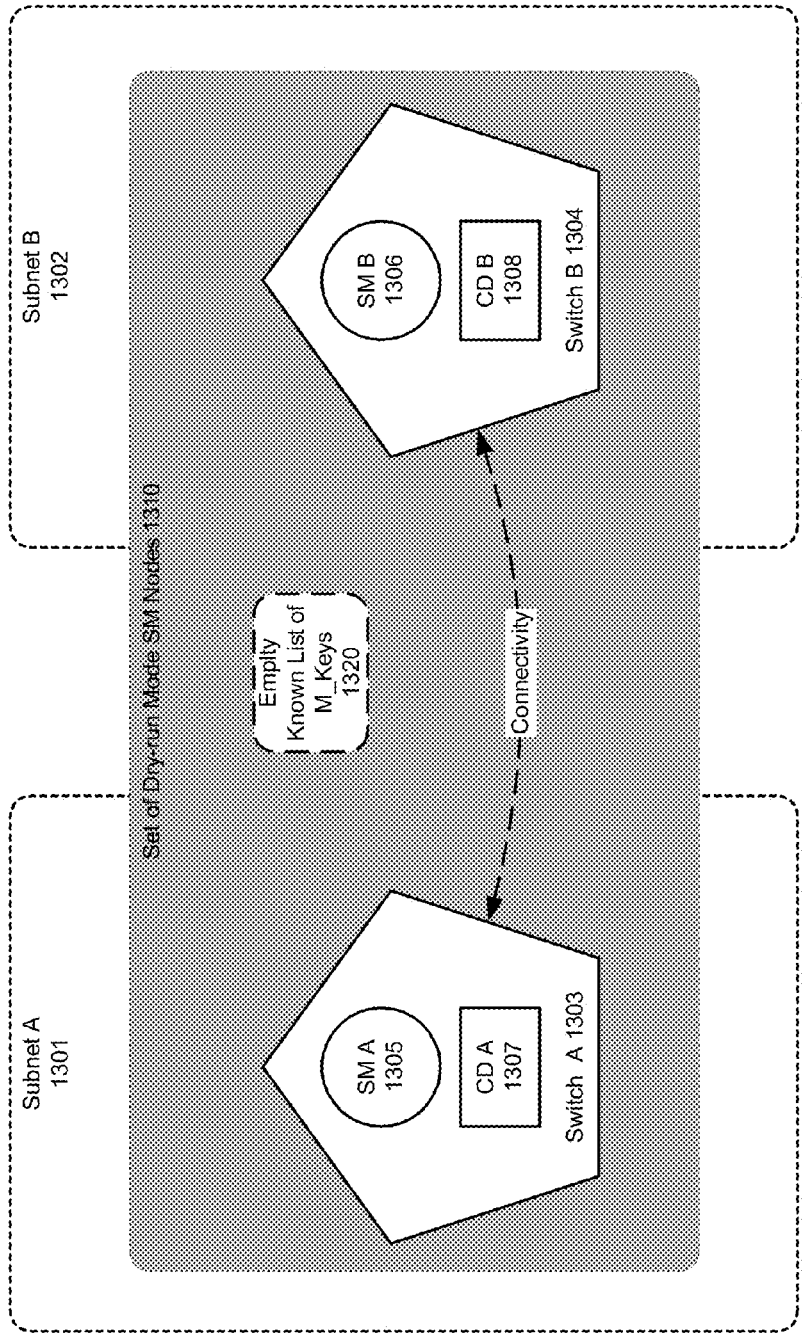
FIG. 13 shows an illustration for supporting controlled merge of different subnets using a dry-run mode in a network environment, in accordance with an embodiment of the invention.

FIG. 13 shows an illustration for supporting controlled merge of different subnets using a dry-run mode in a network environment, in accordance with an embodiment of the invention. As shown in FIG. 13, an IB network 1300 can include a plurality of subnets, e.g. subnet A 1301 and subnet B 1302. Furthermore, subnet A 1301 can include a switch A 1303 with SM A 1305 and CD A 1307, while subnet B 1302 can include a switch B 1304 with SM B 1306 and CD B 1308.

In accordance with an embodiment of the invention, the system can use a dry-run scheme to prepare a new set of subnet manager (SM) nodes 1310 that can be used to support a controlled merge of the subnet A 1301 and the subnet B 1302.

As shown in FIG. 13, SMs A-B 1305-1306, which are both in the dry-run mode, can be ignored by other SMs in the subnets A-B 1301-1302, since they present only an empty set of known secret keys 1320. Also, the master election processes in the subnets A-B 1301-1302 can take the dry-run mode into account, so that SMs A-B 1305-1306 may not be elected as a master SM in either subnet A 1301 or subnet B 1302.

In order to merge the subnets A-B 1301-1302, the system can add the complete set of secret key values from both subnets to the setoff dry-run SM nodes 1310. Then, the system can turn off the dry-run mode in the new set of SM nodes 1310, and the mastership can automatically transfer to the new set of SM nodes 1310. Furthermore, the remaining SMs in the original subnets A-B 1301-1302 can either be disabled or gracefully integrated into the new set of SM nodes 1310.

Unlike the update transactions for the partition and secret key policy in an IB network, which are initiated from the current master, a special dry-run update transaction can be initiated with no current master present within the set of dry-run SM nodes 1310. Furthermore, the dry-run mode can be beneficial for implementing the try-out of a new SM version besides the planned subnet merges. Additionally, SM B 1306 can enter a special dry-run master state, instead of a standby state.

Thus, the SMs in dry run operation can complete the analysis, routing and establishing of configuration and policy information for each port in the complete subnet, without performing any actual update of the subnet. For example, by adding partition policies for the completely merged subnet to the new set of SM nodes in dry run mode, the complete logical connectivity can be verified prior to activation.

Figure 14:
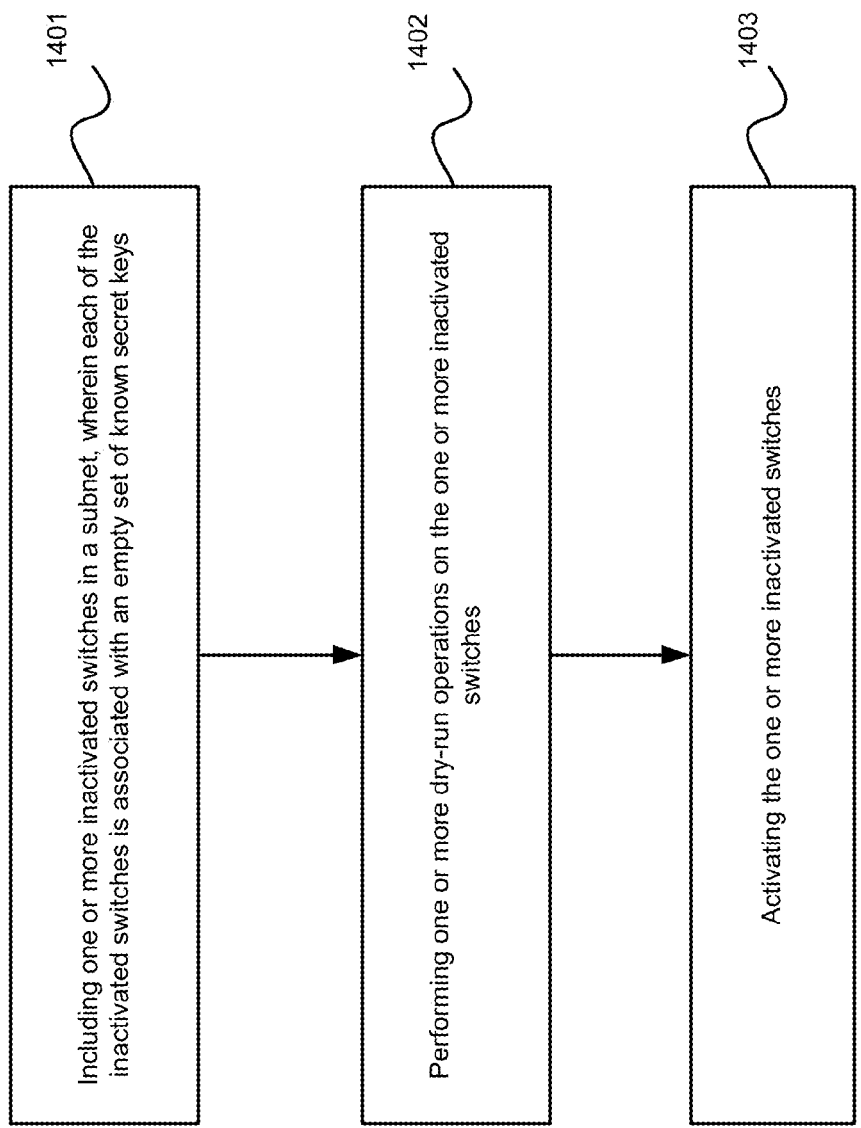
FIG. 14 illustrates an exemplary flow chart for supporting a dry-run mode in a network environment, in accordance with an embodiment of the invention.

FIG. 14 illustrates an exemplary flow chart for supporting a dry-run mode in a network environment, in accordance with an embodiment of the invention. As shown in FIG. 14, at step 1401, the system can include one or more inactivated switches in a subnet, wherein each of the inactivated switches is associated with an empty set of known secret keys. Then, at step 1402, the system can perform one or more dry-run operations on the one or more inactivated switches. Furthermore, at step 1403, the system can activate the one or more inactivated switches.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting security management by a subnet manager (SM) on a network switch in a network environment, the network switch comprising a switch chip comprising a switch chip memory and a processor coupled with the switch chip memory, the method comprising:
   setting up a management key (M_Key) on the switch chip memory of the switch chip in the network switch in the network environment;
   operating a local monitoring daemon on the network switch;
   operating a transactional command line interface (CLI) on the network switch;
   persistently storing, via the local monitoring daemon on the network switch, a current M_Key to the switch chip memory of the switch chip as a persistent secret M_Key;
   prior to enabling external connectivity between the network switch and the network environment following the network switch becoming unmanageable by the SM relative to secure communication between the network switch and the network environment, initializing the M_Key set up on the switch chip memory of the switch chip to match that of the persistent secret M_Key persistently stored to the switch chip memory of the switch chip by the local monitoring daemon;
   preventing any external links of the network switch relative to the network environment from becoming operational unless:
     the persistent secret M_Key initialized to the M_Key set up on the switch chip memory of the switch is a recognized M_Key in the network environment, or
     a refreshed M_Key, selectively received via the CLI operating on the network switch responsive to the persistent secret M_Key initialized to the M_Key set up on the switch chip memory of the switch chip being an unrecognized M-Key in the network environment, is a recognized M_Key in the network environment, or
     the refreshed M_Key, selectively received via the CLI operating on the network switch responsive to the persistent secret M_Key initialized to the M_Key set up on the switch chip memory of the switch chip being an unrecognized M-Key in the network environment, is an M_Key recognized by the local SM; and
   authenticating the network switch relative to the network environment by the local SM using:
     the persistent secret M_Key initialized to the M_Key set up on the switch chip memory of the switch chip, or
     the refreshed M_Key received via the CLI.

2. The method according to claim 1, further comprising: initializing the M_Key of the switch to the persistent secret M_Key prior to enabling external link training, when the switch is rebooted.

3. The method according to claim 1, further comprising:
configuring a persistence mode for the switch using a management configuration backup/restore.

4. The method according to claim 1, further comprising:
persistently storing, as the current M_Key, a current M_Key used by a local subnet manager (SM),
wherein the current M_Key used by the local SM is a state that is dynamically updated in a fabric in the network environment.

5. The method according to claim 1, further comprising:
using an explicit command line interface (CLI) command to update the switch chip with a current local subnet manager (SM) value or with a value known to the local SM, when the switch becomes unmanageable.

6. The method according to claim 1, further comprising:
adding a stale M_Key value to a list of known M_Key values, so that a local subnet manager (SM) can handle the stale M_Key using a SM level update.

7. The method according to claim 1, further comprising:
ensuring that all switches in the network environment have a correct active M_Key value before completing an upgrade/configure change.

8. The method according to claim 1, further comprising:
using, via the local daemon, a periodic get operation to retrieve the secure M_Key on the switch chip.

9. The method according to claim 8, further comprising:
allowing the get operation to be subnet management packet (SMP) based and to use an out-of-band (OOB) interface of the switch chip.

10. The method according to claim 9, further comprising:
configuring a poll frequency of the periodic get operation to be high enough to guarantee that no lease time expiration of the persistent secret M_Key happens independent of local subnet manager (SM) activity.

11. A system for supporting security management by a subnet manager (SM) on a network switch in a network environment, the system comprising:
one or more processors;
a local monitoring daemon, running on the one or more processors;
a transactional command line interface (CLI) running on the one or more processors; and
a switch chip in a switch comprising a switch chip memory operatively coupled with the one or more processors,
wherein the switch chip memory of the switch chip is configured with a management key (M_Key),
wherein the local monitoring daemon operates to persistently store a current M_key to the switch chip memory of the switch chip as a persistent secret M_Key,
wherein prior to enabling one or more external links between the network switch and the network environment a following the network switch becoming unmanageable by the SM relative to secure communication between the network switch and the network environment, the M_Key configured on the switch chip memory of the switch chip is initialized to match the persistent secret M_Key persistently stored to the switch chip memory of the switch chip by the local monitoring daemon,
wherein any external links of the network switch are prevented from becoming operational relative to the network environment unless:
the persistent secret M_Key initialized to the M_Key configured on the switch chip memory of the switch is a recognized M_Key in the network environment, or a refreshed M_Key, selectively received via the CLI operating on the network switch responsive to the persistent secret M_Key initialized to the M_Key configured on the switch chip memory of the switch chip being an unrecognized M-Key in the network environment, is a recognized M_Key in the network environment, or the refreshed M_Key, selectively received via the CLI operating on the network switch responsive to the persistent secret M_Key initialized to the M_Key configured on the switch chip memory of the switch chip being an unrecognized M-Key in the network environment, is an M_Key recognized by the local SM, wherein the network switch is authenticated relative to the network environment by the local SM using:
the persistent secret M_Key initialized to the M_Key set up on the switch chip memory of the switch chip, or
the refreshed M_Key received via the CLI.

12. The system according to claim 11, wherein:
when the switch is rebooted, the M_Key of the switch is selectively initialized to the persistent secret M_Key persistently stored in the switch chip prior to enabling external link training.

13. The system according to claim 11, wherein:
a persistence mode can be configured for the switch using a management configuration backup/restore.

14. The system according to claim 11, wherein:
the local daemon operates to persistently store, as the secure M_Key, a current M_Key used by a local subnet manager (SM),
wherein the current M_Key is a state that is dynamically updated in a fabric in the network environment.

15. The system according to claim 11, wherein:
an explicit command line interface (CLI) command is selectively used to update the secure M_Key on the switch chip with a current local subnet manager (SM) value or with a value known to the SM, when the switch becomes unmanageable.

16. The system according to claim 11, wherein:
a stale M_Key value can be added to a list of known M_Key values so that a local subnet manager (SM) can handle the stale M_Key using a SM level update.

17. The system according to claim 11, wherein:
all switches in the network environment operate to have a correct active M_Key value before completing an upgrade/configure change.

18. The system according to claim 11, wherein:
the local daemon operates to use a periodic get operation to retrieve the secure M_Key value on the switch chip,
wherein the get operation is subnet management packet (SMP) based and uses an out-of-band (00B) interface of the switch chip.

19. The system according to claim 18, wherein:
the periodic get operation is configured with a poll frequency that is high enough to guarantee that no lease time expiration of the secure M_Key happens independent of local subnet manager (SM) activity.

20. A non-transitory machine readable storage medium having instructions stored thereon that when executed cause a system to perform steps for supporting security management by a subnet manager (SM) on a network switch in a network environment, the network switch comprising a switch chip comprising a switch chip memory and a processor coupled with the switch chip memory, the steps comprising:

setting up a management key (M_Key) on the switch chip memory of the switch chip in the network switch in the network environment;

operating a local monitoring daemon on the network switch;

operating a transactional command line interface (CLI) on the network switch;

persistently storing, via the local monitoring daemon on the network switch, the secure a current M_Key to the switch chip memory of the switch chip as a persistent secret M_Key;

prior to enabling external connectivity between the network switch and the network environment following the network switch becoming unmanageable by the SM relative to secure communication between the network switch and the network environment, initializing the M_Key set up on the switch chip memory of the switch chip to match that of the persistent secret M_Key persistently stored to the switch chip memory of the switch chip by the local monitoring daemon;

preventing any external links of the network switch relative to the network environment from becoming operational unless:

the persistent secret M_Key initialized to the M_Key set up on the switch chip memory of the switch is a recognized M_Key in the network environment, or a refreshed M_Key, selectively received via the CLI operating on the network switch responsive to the persistent secret M_Key initialized to the M_Key set up on the switch chip memory of the switch chip being an unrecognized M-Key in the network environment, is a recognized M_Key in the network environment, or the refreshed M_Key, selectively received via the CLI operating on the network switch responsive to the persistent secret M_Key initialized to the M_Key set up on the switch chip memory of the switch chip being an unrecognized M-Key in the network environment, is an M_Key recognized by the local SM; and authenticating the network switch relative to the network environment by the local SM using:

the persistent secret M_Key initialized to the M_Key set up on the switch chip memory of the switch chip, or the refreshed M_Key received via the CLI.

* * * * *

UNITED STATES PATENT AND TRADEMARK OFFICE
CERTIFICATE OF CORRECTION

PATENT NO. : 9,852,199 B2
APPLICATION NO. : 13/892152
DATED : December 26, 2017
INVENTOR(S) : Bjørn Dag Johnsen et al.

Page 1 of 1

It is certified that error appears in the above-identified patent and that said Letters Patent is hereby corrected as shown below:

In the Claims

In Column 21, Line 9, After "switch", delete "the secure".

Signed and Sealed this
Eighteenth Day of June, 2019

Andrei Iancu
*Director of the United States Patent and Trademark Office*